US012696204B2

(12) United States Patent
Mohammadian et al.

(10) Patent No.: US 12,696,204 B2
(45) Date of Patent: Jul. 28, 2026

(54) ASYNCHRONOUS BIDIRECTIONAL COMMUNICATIONS IN CELL FREE NETWORKS

(71) Applicant: Telefonaktiebolaget LM Ericsson (publ), Stockholm (SE)

(72) Inventors: Roozbeh Mohammadian, Oshawa (CA); Shahram Shahbazpanahi, Whitby (CA); Zahra Pourgharehkhan, Nepean (CA); Majid Bavand, Ottawa (CA); Gary Boudreau, Kanata (CA); Israfil Bahceci, Kanata (CA); Ali Afana, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 321 days.

(21) Appl. No.: 18/689,998

(22) PCT Filed: Sep. 6, 2022

(86) PCT No.: PCT/IB2022/058372
§ 371 (c)(1),
(2) Date: Mar. 7, 2024

(87) PCT Pub. No.: WO2023/037242
PCT Pub. Date: Mar. 16, 2023

(65) Prior Publication Data
US 2025/0133511 A1 Apr. 24, 2025

Related U.S. Application Data

(60) Provisional application No. 63/242,918, filed on Sep. 10, 2021.

(51) Int. Cl.
H04B 1/00 (2006.01)
H04B 15/00 (2006.01)
(Continued)

(52) U.S. Cl.
CPC ....... *H04W 52/367* (2013.01); *H04W 52/267* (2013.01)

(58) Field of Classification Search
None
See application file for complete search history.

(56) References Cited

U.S. PATENT DOCUMENTS 7,673,219 B2 * 3/2010 Molisch ................. H04B 7/026
714/772
7,684,337 B2 * 3/2010 Mehta ................... H04W 40/06
455/13.1
(Continued)

FOREIGN PATENT DOCUMENTS

WO 2022162425 A1 8/2022

OTHER PUBLICATIONS

International Search Report and Written Opinion of the International Searching Authority, PCT/IB2022/058372, mailed Dec. 13, 2022, 13 pages.
(Continued)

*Primary Examiner* — Tuan A Tran
(74) *Attorney, Agent, or Firm* — Sage Patent Group

(57) ABSTRACT

A method to minimize a total transmit power in a bidirectional asynchronous cell free network where at least two transceivers, TRs, exchange their information using a number of amplify and forward, AF, based access points, APs, the total transmit power subject to quality of service, QoS constraints on TR data-rates, where the method includes estimating channels between the at least two TRs and the AF-based Aps. The method includes calculating a total power consumption for each channel tap. The method includes determining a single non-zero channel tap which results in a lowest total power consumption. The method includes, based on the single non-zero channel tap determined: calculating beamforming matrices for the APs; cal-
(Continued)

culating a total power transmission of each transceiver of the at least two transceivers; calculating precoding matrices at each transceiver of the at least two transceivers; and calculating post-channel equalizers at the at least two transceivers.

20 Claims, 7 Drawing Sheets

(51) Int. Cl.
*H04W 52/26*       (2009.01)
*H04W 52/36*       (2009.01)

(56)       References Cited

U.S. PATENT DOCUMENTS

| | | | | |
|---|---|---|---|---|
| 8,027,301 | B2 * | 9/2011 | Oyman | H04B 7/026 370/330 |
| 8,050,620 | B2 * | 11/2011 | Miyanaga | H04B 7/026 455/7 |
| 8,199,693 | B2 * | 6/2012 | Hwang | H04W 52/46 455/574 |
| 8,228,836 | B2 * | 7/2012 | Erkip | H04B 7/2606 370/315 |
| 8,630,310 | B2 * | 1/2014 | Sethakaset | H04L 1/0014 370/259 |
| 8,744,513 | B2 * | 6/2014 | Chen | H04W 52/367 455/120 |
| 8,811,320 | B2 * | 8/2014 | Inohiza | H04B 7/088 370/252 |
| 8,862,051 | B2 * | 10/2014 | Gan | H04B 7/2606 370/293 |
| 8,954,078 | B2 * | 2/2015 | Van Phan | H04W 36/08 370/335 |
| 9,014,237 | B2 * | 4/2015 | Li | H04B 7/0456 375/295 |
| 9,131,510 | B2 * | 9/2015 | Wang | H04W 72/54 |
| 9,420,476 | B2 * | 8/2016 | Koutsimanis | H04J 11/005 |
| 9,426,754 | B2 * | 8/2016 | Steer | H04W 52/18 |
| 9,445,380 | B2 * | 9/2016 | Cheng | H04W 52/46 |
| 9,577,722 | B2 * | 2/2017 | Li | H04B 7/026 |
| 9,736,886 | B2 * | 8/2017 | Kwon | H04B 7/0408 |
| 10,034,297 | B2 * | 7/2018 | Gandhi | H04B 1/3838 |
| 10,042,852 | B2 * | 8/2018 | Boudreau | H04B 7/026 |
| 10,605,888 | B1 * | 3/2020 | Azem | G01S 3/38 |
| 11,611,388 | B2 * | 3/2023 | Lin | H04B 7/15535 |
| 12,004,088 | B2 * | 6/2024 | Ying | H04W 52/367 |
| 12,101,164 | B2 * | 9/2024 | Mehrabani | H04B 7/15578 |
| 12,356,311 | B2 * | 7/2025 | Tarighat Mehrabani | H04B 1/0096 |
| 12,389,430 | B2 * | 8/2025 | Li | H04W 52/365 |

OTHER PUBLICATIONS

Ammar, Hussein A. et al., "User-centric Cell-free Massive MIMO Networks: A Survey of Opportunities, Challenges and Solutions," arXiv.2104.14589v1, Apr. 29, 2021, 78 pages.

Kiani, Sharareh et al., "Power-Optimal Distributed Beamforming for Multi-Carrier Asynchronous Bidirectional Relay Networks," IEEE Transactions on Signal and Information Processing Over Networks, vol. 7, 2021, 16 pages.

Kianiharchehgani, Sharareh et al., "Joint Power Allocation and Distributed Beamforming Design for Multi-Carrier Asynchronous Two-Way Relay Networks," 2019 IEEE 20th International Workshop on Signal Processing Advances in Wireless Communications (SPAWC); Jul. 2, 2019, 5 pages.

Kiani, Sharareh et al., "Joint Power Allocation and Distributed Equalization Design for OFDM-Based Filter-and-Forward Two-Way Multi-Relay Networks," IEEE Transactions on Signal Processing, vol. 69, May 7, 2021, 17 pages.

Rahimi, Razgar et al., "Asynchronous Two-Way MIMO Relaying: A Multi-Relay Scenario," IEEE Transactions on Wireless Communications, vol. 17, No. 7, Jul. 2018, 18 pages.

* cited by examiner

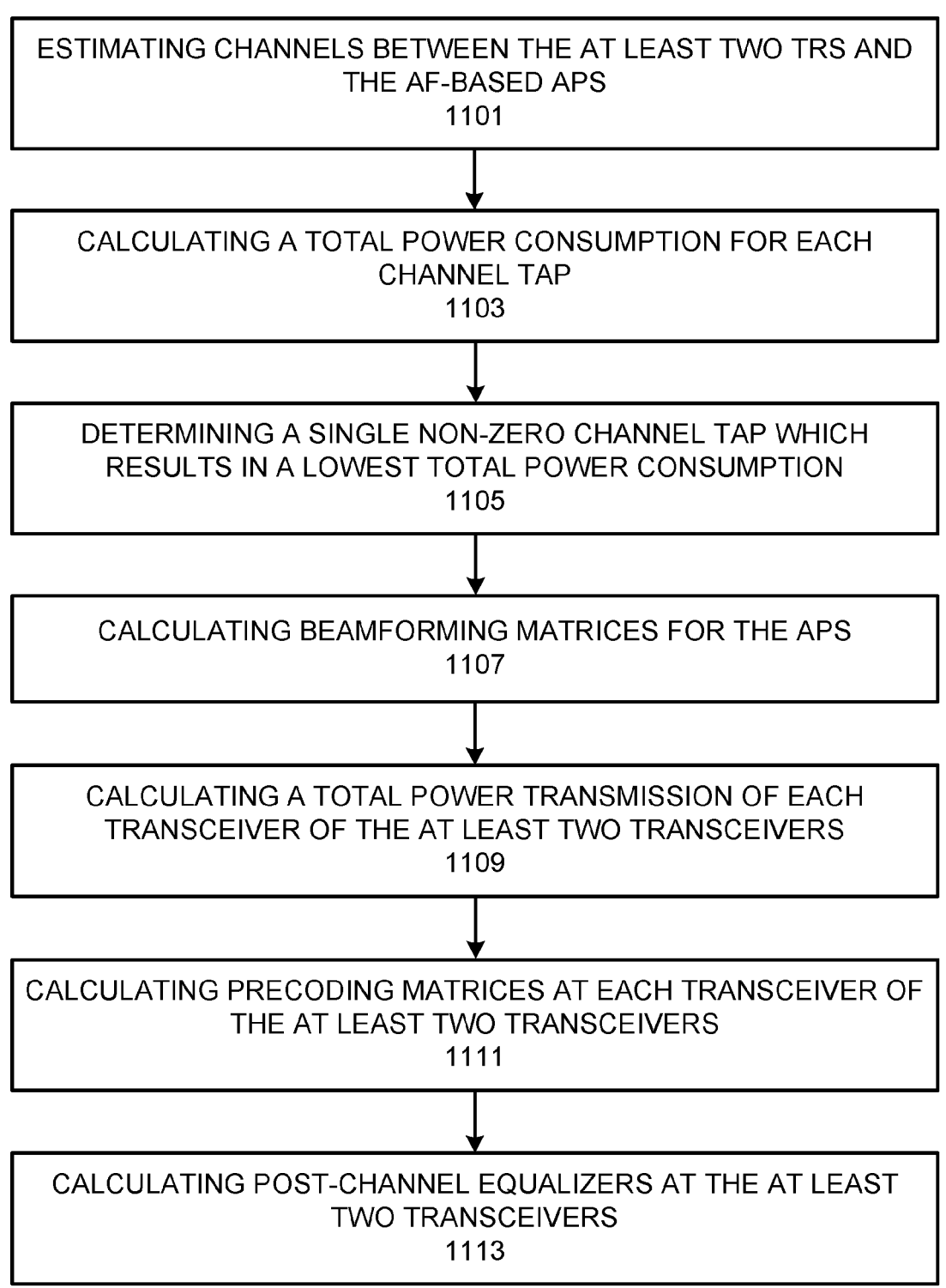

ESTIMATING CHANNELS BETWEEN THE AT LEAST TWO TRS AND
THE AF-BASED APS
1101

CALCULATING A TOTAL POWER CONSUMPTION FOR EACH
CHANNEL TAP
1103

DETERMINING A SINGLE NON-ZERO CHANNEL TAP WHICH
RESULTS IN A LOWEST TOTAL POWER CONSUMPTION
1105

CALCULATING BEAMFORMING MATRICES FOR THE APS
1107

CALCULATING A TOTAL POWER TRANSMISSION OF EACH
TRANSCEIVER OF THE AT LEAST TWO TRANSCEIVERS
1109

CALCULATING PRECODING MATRICES AT EACH TRANSCEIVER OF
THE AT LEAST TWO TRANSCEIVERS
1111

CALCULATING POST-CHANNEL EQUALIZERS AT THE AT LEAST
TWO TRANSCEIVERS
1113

Figure 11

ASYNCHRONOUS BIDIRECTIONAL COMMUNICATIONS IN CELL FREE NETWORKS

CROSS REFERENCE TO RELATED APPLICATIONS

This application is a 35 U.S.C. § 371 national stage application of PCT International Application No. PCT/IB2022/058372 filed on Sep. 6, 2022, which in turn claims domestic priority to U.S. Provisional Patent Application No. 63/242,918, filed on Sep. 10, 2021, the disclosures and content of which are incorporated by reference herein in their entirety.

TECHNICAL FIELD

The present disclosure relates generally to communications, and more particularly to communication methods and related devices and nodes supporting wireless communications.

BACKGROUND

A cell-free network is a distributed network in which joint signal processing is used over many access points (APs) or base stations (BSs) to serve users. In Cell free networks, access points (APs) are distributed over a large area. Consequently, in such networks, when a transceiver (TR) pair aims at exchanging information in a bidirectional manner with high data-rates, the end-to-end channels between TRs turn out to be multi-tap. This is due to the fact that the signals received at TRs through different APs experience different propagation delays. Such networks, called asynchronous Cell free networks, should deal with an inter-symbol interference (ISI) problem.

Bidirectional communications, also known as Two-way relaying, has been studied widely in different research contexts. (See for example, [1] R. Rahimi and S. Shahbazpanahi, "Asynchronous Two-Way MIMO Relaying: A Multi-Relay Scenario," in *IEEE Transactions on Wireless Communications*, vol. 17, no. 7, pp. 4270-4287 July 2018, doi: 10.1109/TWC.2018.2822274 and [2] S. Kiani, S. ShahbazPanahi, M. Dong and G. Boudreau, "Power-Optimal Distributed Beamforming for Multi-Carrier Asynchronous Bidirectional Relay Networks," in *IEEE Transactions on Signal and Information Processing over Networks*, vol. 7, pp. 114-129, 2021, doi: 10.1109/TSIPN.2020.3044962. Commonly, bidirectional communications systems adopt multiple access and broadcast (MABC) protocol, a two-phase protocol, for information exchange between a TR pair. Based on MABC protocol, in the first phase of communications, i.e., the multiple access (MA) phase, the TRs at both ends of communications link simultaneously send their signals to APs, or relays. Then APs, transmit the processed version of their received signals towards the TRs in the second phase of communications, i.e., broadcast (BC) phase.

Conventionally, APs use decode-and-forward (DF) or amplify-and-forward (AF) strategies for interchanging information between TRs. Employing the DF method, the received signals at APs are first decoded for exploring the errors, and then encoded again to be broadcasted towards the TRs. In AF scheme, the received signals at APs are amplified and phase-shifted before broadcasted to TRs. Compared to the DF technique, the AF methods burden lower computational complexity on APs, and therefore, are more appealing in practical systems.

Employing multiple antennas at APs, AF strategy has been considered to mitigate the ISI (inter-symbol-interference) effect in asynchronous bidirectional networks [1]. The solution proposed in [1] considers block wise single-carrier communications, where a cyclic prefix (CP) is used to eliminate the ISI effect between successive information blocks. To remove the intra-block interference, the beamforming (BF) matrices at APs and the transmit powers of TRs are found through an optimization problem aiming at minimizing the total consumed power in the network under constraints on the data-rates of TRs. Using OFDM (orthogonal frequency division multiplexing) modulation at TRs, total power minimization problem subject to constraints on TRs' data-rates has been considered in [2] for multi-carrier bidirectional communications; however, information exchange between TRs are performed vis single-antenna APs in [2].

There currently exist certain challenge(s). The existing schemes in the context of asynchronous bidirectional communications can be divided into single-carrier and multi-carrier systems. However, there is no method which is applicable to both the single-carrier and multi-carrier modulation. The existing solutions for mitigating ISI either are only applicable to single-carrier setups [1] or are just suitable for multi-carrier systems [2].

SUMMARY

Certain aspects of the disclosure and their embodiments may provide solutions to these or other challenges. In various embodiments of inventive concepts, a bidirectional communication method between at least two single-antenna TRs in an asynchronous cell-free network is provided, which is applicable to both the single-carrier and multi-carrier systems having APs that enables the information exchange between TRs employ multiple antennas. In order to restrain the ISI effect, a CP assisted block transmission is adopted. Employing the CP, it is still required to deal with the intra-block interference resulting from ISI. Therefore, the joint pre- and post-channel equalizers at both the TRs are considered to mitigate the impact of intra-block interference. Employing an AF technique at the APs and power control at TRs, the optimal structures of equalizers, the BF gains of APs, and the transmit powers of TRs are found through an optimization problem which aims at minimizing the total consumed power in the network while guaranteeing predefined data rates at TRs. The optimization problem is computationally prohibitive; therefore, to be able to find a cost efficient solution, it is assumed that the BF matrices at APs should be symmetric. Under this assumption, a semi closed-form solution for the optimization problem is achieved. Based on the resulting solution, for optimality, only a synchronous subset of the APs should participate in the communication process. Furthermore, to have the optimum performance the pre-equalizer matrices should be unitary and the post-equalizer matrices should be invertible.

According to some embodiments of inventive concepts, a method to minimize a total transmit power in a bidirectional asynchronous cell free network where at least two transceivers, TRs, exchange their information using a number of amplify and forward, AF, based access points, APs, the total transmit power subject to quality of service, QoS constraints on data-rates of the TRs is provided. The method includes estimating channels between the at least two TRs and the AF-based APs. The method further includes calculating a total power consumption for each channel tap. The method further includes determining a single non-zero channel tap which results in a lowest total power consumption. The method further includes based on the single non-zero channel tap determined: calculating beamforming matrices for the APs; calculating a total power transmission of each transceiver of the at least two transceivers; calculating precoding matrices at each transceiver of the at least two transceivers; and calculating post-channel equalizers at the at least two transceivers.

Analogous transceiver devices, computer program, and computer program products are also provided.

Certain embodiments may provide one or more of the following technical advantage(s). By employing pre- and post-channel equalizers at both the TRs, various embodiments are applicable to both the multi-carrier and single-carrier systems. The embodiments described herein minimize the average total power consumed in the network subject to the quality of service (QoS) constraints on the TRs' date rates. Considering symmetric BF matrices at APs, and devising a dimensionality reduction procedure, optimal BF matrices of APs and transmit powers of TRs are found by means of a simple and fast algorithm.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 11 is a flow chart illustrating operations of a transceiver according to some embodiments of inventive concepts.

DETAILED DESCRIPTION

Some of the embodiments contemplated herein will now be described more fully with reference to the accompanying drawings. Embodiments are provided by way of example to convey the scope of the subject matter to those skilled in the art, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

As previously indicated, in various embodiments of inventive concepts, a bidirectional communication method between at least two single-antenna TRs in an asynchronous cell-free network is provided, which is applicable to both the single-carrier and multi-carrier systems having APs that enables the information exchange between TRs employ multiple antennas.

Figure 1:
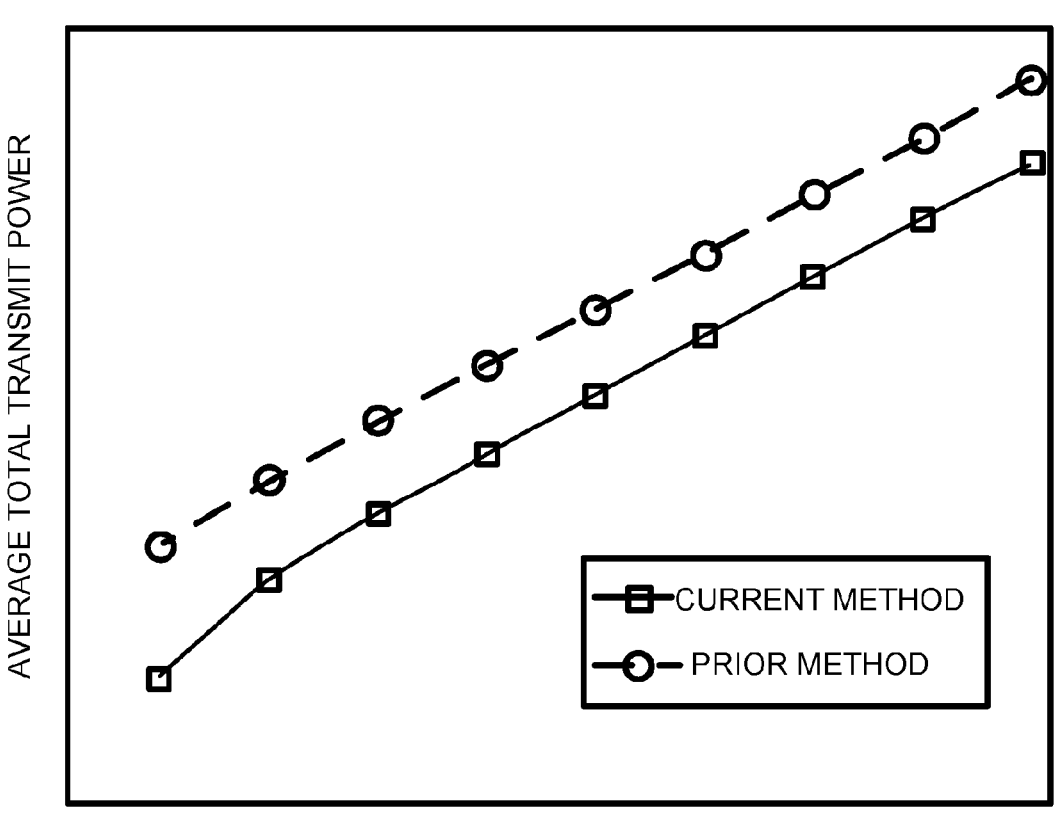
FIG. 1 is a graph illustrating a comparison between the various embodiments of a current method according to some embodiments of inventive concepts and a prior method.

As illustrated in FIG. 1, applying multi-antenna APs, the various embodiments of inventive concepts offers a cell free network with lower total power consumption compared to the existing networks. Consequently, the various embodiments described herein provide a step forward towards the feasibility of the green communications systems. In addition, the pre- and post-channel equalizers at the TRs brings about the applicability of the proposed method in both the single-carrier and multi-carrier networks. The various embodiments take into account different delays corresponding to distinct end-to-end available paths between the TRs, and enables asynchronous wireless communications in practical systems. Unknown parameters of the network are designed based on a semi-closed form solution which is computationally efficient and very fast. Furthermore, the various embodiments described herein are easily applicable to massive antenna systems.

Figure 2:
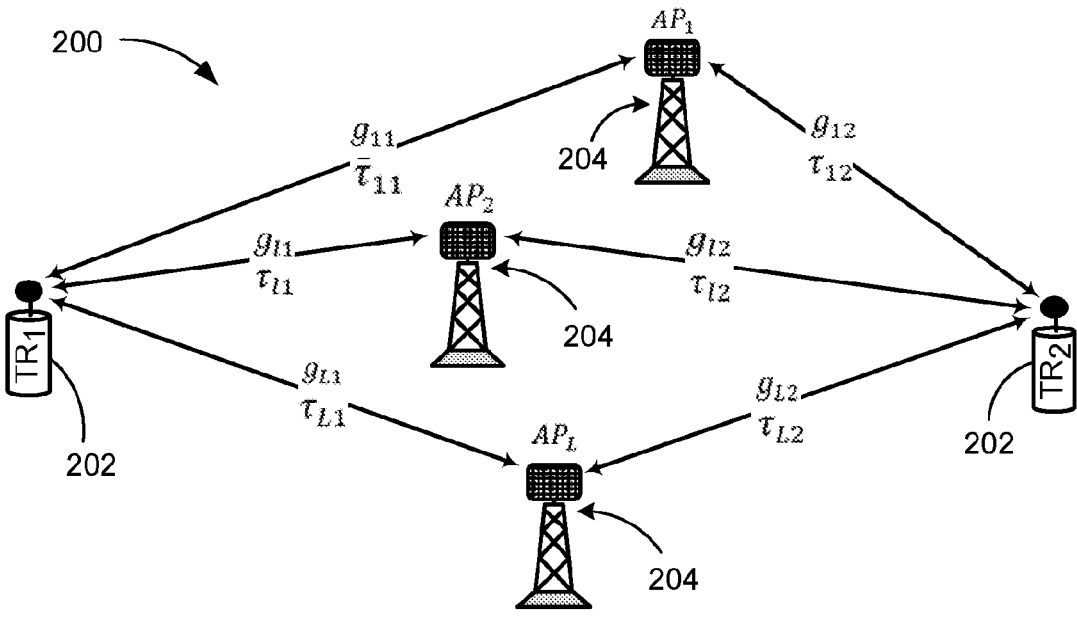
FIG. 2 is a block diagram illustrating a asynchronous bidirectional Cell free network according to some embodiments of inventive concepts.

FIG. 2 illustrates an example of an asynchronous bidirectional Cell free network 20 in which various embodiments of the inventive concepts may be implemented. FIG. 2 shows two transceivers 202 designated as TR1 and TR2. The transceivers may be single antenna transceivers or multiple antenna receivers. While two transceivers 202 are shown, in other embodiments, there are more than two transceivers 202. FIG. 2 also has a number L of multi-antenna APs 204 where each AP 204 employs M antennas. There are no direct links between transceivers 202.

In the system of FIG. 2, channels between TRs 202 and APs 204 are assumed to be frequency-flat. As both the uplink and the downlink transmissions take place at the same frequency, channel reciprocity can be utilized for estimating the channel state information (CSI) at APs 204 using the uplink training signals transmitted by the TRs 202. Estimated CSI at APs 204 then is fed back to the TRs 202. Thus, we assume that the perfect CSI is available at both the TRs 203 and the APs 204.

In FIG. 2, $\tau_{l1}$ represents the propagation delay between TR1 and $AP_l$, while $\tau_{l2}$ denotes the propagation delay between TR2 and $AP_l$. Also, shown in FIG. 2, $g_{l1}$ represents the channel gain vector between TR1 and $AP_l$, while $g_{l2}$ denotes the channel gain vector between TR2 and $AP_l$. Both $g_{l1}$ and $g_{l2}$ are of size M×1.

Since APs are distributed over a relatively large area the channels between each TR and APs may have different propagation delays. For instance, in FIG. 2, it is possible to have $\tau_{l1} \neq \tau_{l1} \neq \tau_{L1}$ for TR1, or $\tau_{l2} \neq \tau_{l2} \neq \tau_{L2}$ for TR2. According to the channel reciprocity, the end-to-end propagation delay between TR1 and TR2 through $AP_l$ is defined as $\tau_l \triangleq \tau_{l1} + \tau_{l2}$.

Since $\tau_l$ may have different values for different APs, the end-to-end channels between TR1 and TR2 can be modeled as a multi-tap channel. Without loss of generality, one can assume that the AP indices are sorted based on their corresponding end-to-end path delays in an ascending order. That is, $\tau_1 \le \tau_2 \le \ldots \le \tau_L$. Based on this assumption, the discrete-time end-to-end multi-tap channel length is defined as $$L_C = 1 + \left\lceil \frac{\tau_L}{T_s} \right\rceil, \quad (1)$$

and the AP indices can be partitioned into $L_c$ different clusters as follows $$\mathcal{C}_{n+1} \triangleq \left\{ l \,\middle|\, \left\lceil \frac{\tau_l}{T_s} \right\rceil = n \right\}, n \in \{0, 1, \ldots, L_C - 1\}, \quad (2)$$

where $T_s$ is the symbol period. In fact, $\mathcal{C}_{n+1}$, defined above, contains the indices of those APs which contribute to the n-th tap of the end-to-end channel impulse responses (CIRs) between TR1 and TR2. Note that each AP contributes to only one channel tap, and if none of the APs contribute to the n-th tap of the end-to-end CIRs then we have $\mathcal{C}_{n+1} = 0$.

Figure 3:
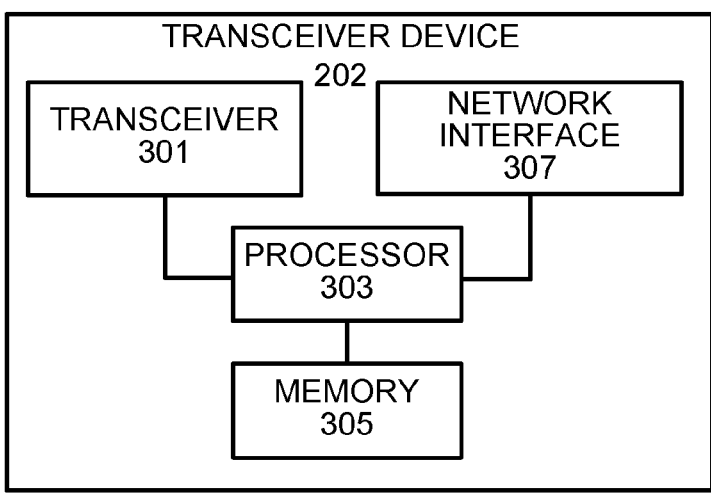
FIG. 3 is a block diagram illustrating a structure of a transceiver according to some embodiments of inventive concepts.

FIG. 3 is a block diagram illustrating elements of a transceiver device 202 (also referred to as a network node, etc.) configured to provide cellular communication according to embodiments of inventive concepts. As shown, the transceiver device 202 may include transceiver circuitry 301 (also referred to as a transceiver) including a transmitter and a receiver configured to provide uplink and downlink radio communications with mobile terminals. The RAN node may include network interface circuitry 307 (also referred to as a network interface) configured to provide communications with other nodes (e.g., with other transceivers and access points) of the cell free network 200. The transceiver device 202 may also include processing circuitry 303 (also referred to as a processor) coupled to the transceiver circuitry, and memory circuitry 305 (also referred to as memory) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that a separate memory circuitry is not required. The transceiver device in other embodiments may be implemented in a virtual environment (e.g., a cloud network) where various modules distributed across the environment performs various operations of the transceiver device 202.

As discussed herein, operations of the transceiver device 202 may be performed by processing circuitry 303, network interface 307, and/or transceiver 301. For example, processing circuitry 303 may control transceiver 301 to transmit downlink communications through transceiver 301 over a radio interface to one or more access points and/or to receive uplink communications through transceiver 301 from one or more access points over a radio interface. Similarly, processing circuitry 303 may control network interface 307 to transmit communications through network interface 307 to one or more other access points and/or to receive communications through network interface from one or more other access points. Moreover, modules may be stored in memory 305, and these modules may provide instructions so that when instructions of a module are executed by processing circuitry 303, processing circuitry 303 performs respective operations (e.g., operations discussed below with respect to Example Embodiments relating to transceiver devices). According to some embodiments, transceiver device 202 and/or an element(s)/function(s) thereof may be embodied as a virtual node/nodes and/or a virtual machine/machines.

TR Structures

Because the end-to-end channels between TRs are multi-path, inter-symbol-interference (ISI) may have to be dealt with. In order to restrain the ISI effect, the Cyclic Prefix (CP) assisted block transmission of the information symbols can be used. The CP's length should be greater than or equal to $L_c$, defined above. Besides utilizing CP, pre- and post-channel equalizer blocks are also employed in various embodiments at both the TRs to mitigate the ISI effect. Structures of the pre- and post-channel equalizers have direct impacts on the achievable data rates of TRs. In addition to the pre- and post-channel equalizers, the achievable data rates of TRs are determined by the BF matrices of APs and the transmit powers of TRs.

Figures 4, 5:
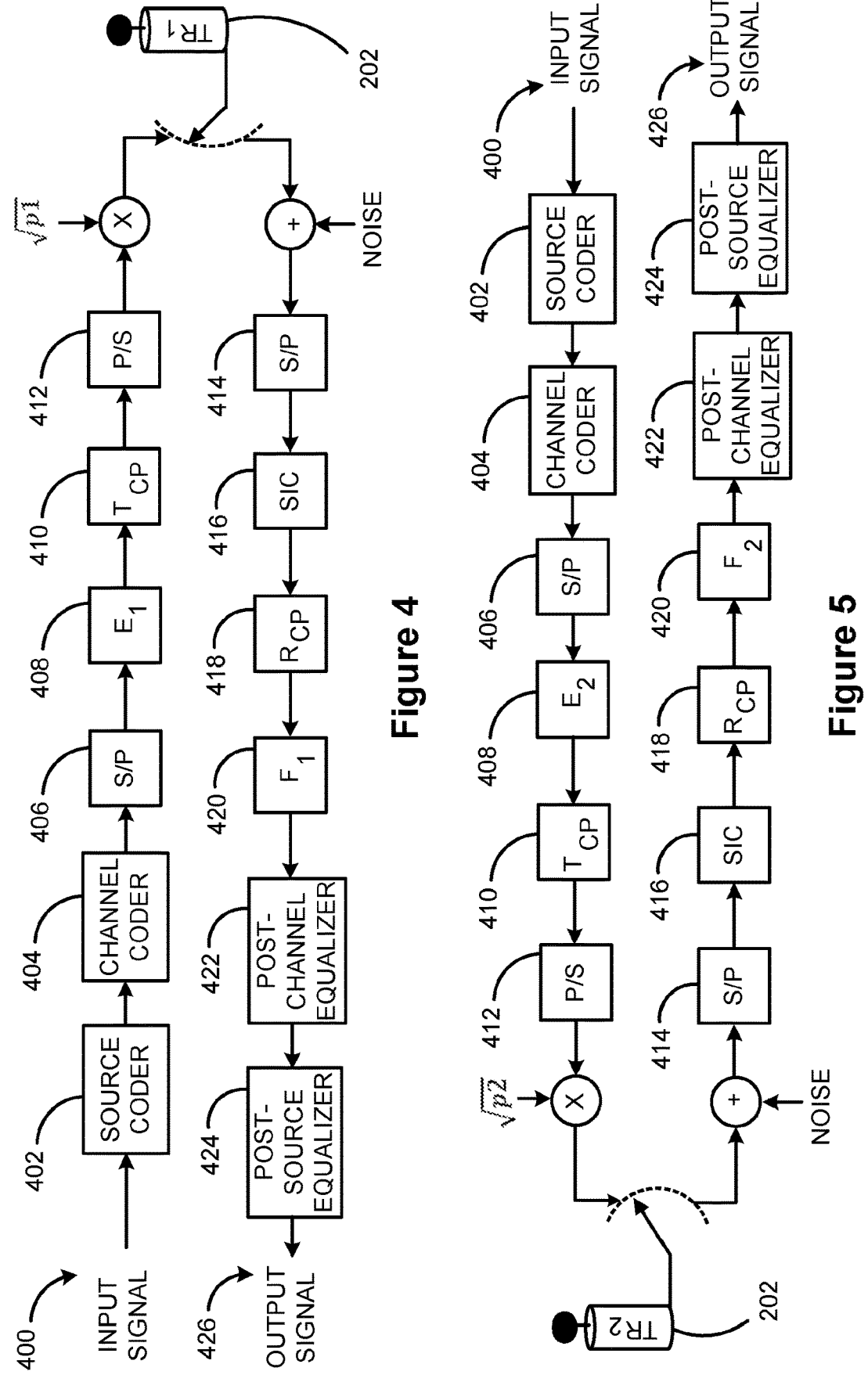
FIG. 4 is a block diagram illustrating a structure of a first transceiver according to some embodiments of inventive concepts.
FIG. 5 is a block diagram illustrating a structure of a second transceiver according to some embodiments of inventive concepts.

The detailed structure of the TRs is some embodiments are illustrated in FIG. 4 and FIG. 5. Depicted in these figures, at each transmitter branch of the TRs, the input stream 400 is first passed through source coder 402 and channel coder 404 to be coded. In the next step, the output stream of channel coder 404 enters a serial-to-parallel conversion block 406 (denoted as "S/P") thereby constructing a vector of data symbols containing Ns symbols. Then, to perform the pre-equalization, input data blocks to TR1 and TR2 are multiplied by Ns×Ns pre-equalization matrices 408 (e.g., E1 and E2, respectively). The output of the pre-equalizer blocks 408 then are passed through CP-insertion block (represented by $T_{cp}$) 410. After CP insertion, the signal block goes through a parallel-to-serial conversion block 412 (denoted as "P/S") and is converted to a block of serial symbols. At the final step, before being transmitted by TR1 and TR2, signals are multiplied by p1 and p2, respectively As illustrated in FIG. 4 and FIG. 5, at the receiver branch of each TR, the received signal samples are passed through a serial-to-parallel ("S/P") conversion block 414 to form a signal block of length Ns. Then, self-interference (SI) terms are subtracted from the received signals using the self-interference-cancellation (SIC) blocks 416. In the next step, the CPs of the received signals are removed by $R_{cp}$ (cyclic prefix removal) blocks 418. After CP elimination, in order to estimate the received data, TR1 and TR2, respectively, multiply their received signals by the post-channel equalizer matrices 420 (e.g., F1 and F2). At the final step, the output of post-channel equalizer 420 is passed through the post-channel equalizer 422 and post-source equalizer 424 to produce output signals 426.

Network Planning Recommendation

Figure 6:
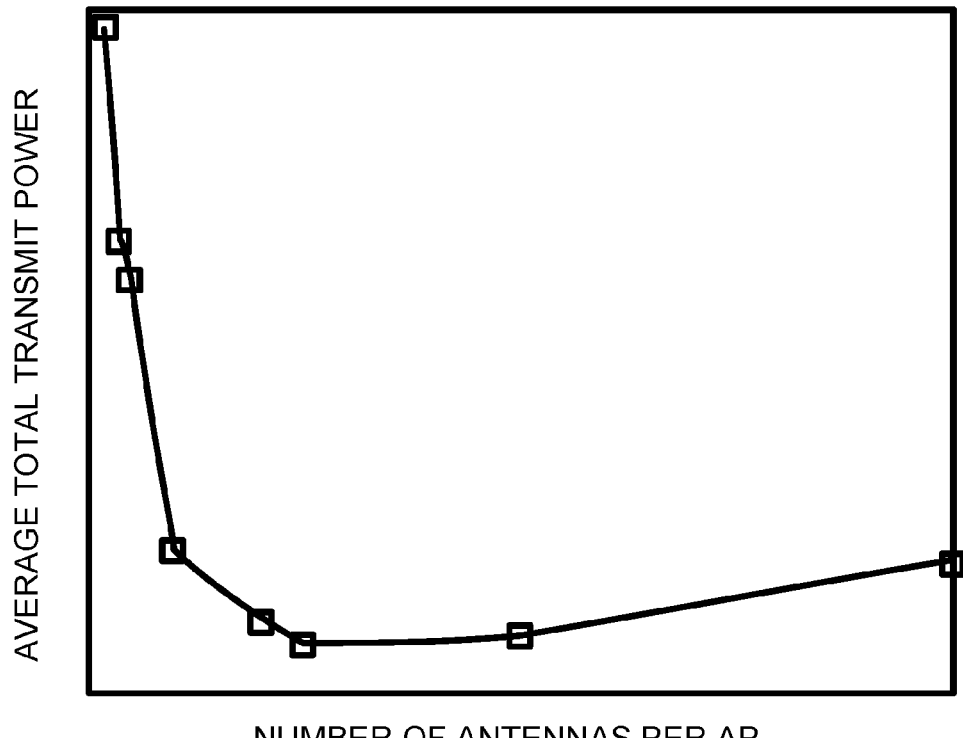
FIG. 6 is a graph illustrating an average total transmit power versus number of antennas per AP according to some embodiments of inventive concepts.

For a fix total number of antennas available in the network, i.e., M×L=cte, there is an optimal number of antennas per AP, resulting in the best performance in terms of the least power consumption in the network. This optimal number is the consequence of a tradeoff between the BF gain and the diversity gain. Choosing large values for M results in small numbers of APs, and consequently lowers the spatial diversity gain. Conversely, small values of M turn into high values of spatial diversity gain and low values for BF gain. For relatively long distances between TRs the effect of diversity gain becomes dominant. This is due to the fact that distribution of a relatively large number of APs in the coverage area can, on average, decrease the distance of TRs from the closest AP. When TRs are relatively located close to each other BF gain becomes more advantageous than spatial diversity gain. This tradeoff is illustrated in FIG. 6.

In order to optimize figures of merit such as network throughput or consumed power of the network, the BF matrices, pre- and post-channel equalizers and TRs' transmit powers should be taken into account. The optimal solution for the figures of merit is achieved when only a synchronous subset of APs is selected and the remainder of the APs do not take part in information exchange between TRs. In other words, at the optimum, only a subset of APs who contribute to the best tap of the end-to-end channel should be active. Thus, to have the best performance the end-to-end multi-tap channels between TRs should turn to a reciprocal single-tap channel. To find the best channel tap and the associated optimum TRs' transmit power, the optimal structures of equalizers and BF matrices, one can consider the network consumed power minimization problem.

Power Minimization

In this problem, we aim at minimizing the total transmit power subject to the quality of service (QoS) constraints on TRs' data-rates in a bidirectional asynchronous cell free network where two TRs exchange their information using a number of AF-based APs. The consumed power in the proposed network is the sum of the powers transmitted by the TRs and the transmitted powers of the APs, and its average is calculated as:

$$P_T = p_1 \left( 1 + \sum_{l=1}^{L} \|A_l g_{l1}\|^2 \right) + p_2 \left( 1 + \sum_{l=1}^{L} \|A_l g_{l2}\|^2 \right) + \sigma^2 \sum_{l=1}^{L} \|A_l\|_F^2. \quad (3)$$

In the above equation, $\sigma^2$ is the AP's noise power, and $A_l$, a matrix of dimension $M \times M$, represents the BF matrix of l–th AP. In such a network, the data-rates of TRs are directly influenced by the pre- and post-equalizers' structures, BF matrices of APs, and TRs' transmit powers. Thus, the optimal structures of equalizers, APs' BF matrices, and the optimal values of TRs' transmit powers are found through solving the following optimization problem:

$$\min_{\substack{A_1,\ldots,A_L}} \min_{\substack{p_1 \\ p_2}} \min_{\substack{E_1 \\ E_2}} \min_{\substack{F_1 \\ F_2}} P_T \quad (4)$$

subject to $R_1 \geq r_1, p_1 > 0, \|E_1\|_F^2 = N_s,$ rank $(E_1) = N_s$, rank $(F_1) = N_s$ $R_2 \geq r_2, p_2 > 0, \|E_2\|_F^2 = N_s$, rank $(E_2) = N_s$, rank $(F_2) = N_s$ $R_1$ and $R_2$ are, respectively, the achievable data-rates of TR1 and TR2. Also, in (4), $r_1$ and $r_2$ denote the predefined thresholds for data-rates of TR1 and TR2, respectively. In (4), constraints on the ranks of the pre- and post-equalizer matrices are considered to guarantee their invertibility.

Note that the optimization problem of equation (4) is non-convex and nonlinear. Therefore, solving (4) can be very challenging.

Embodiment 1

In a first embodiment of solving (4), the optimization problem can be solved for an optimal solution using brute force search which is computationally intractable. Also, tolerating lower precision, heuristic methods can be used to solve (4) for suboptimal solutions.

Embodiment 2

Solving (4) without any assumption on the structure of the APs' BF matrices can be very challenging. Therefore, in this method embodiment, an optimal solution for (4) which is computationally efficient and very fast is desirable. Towards this goal, at the first step, it is assumed that the BF matrices at APs should be symmetric. Under this assumption, the end-to-end channels between TRs become reciprocal. This, in turn, results in that the optimization problem of (4) becomes independent of the channel equalizers, and to achieve optimal solution pre-channel equalizers should be unitary matrices and post-channel equalizers should be invertible matrices. Consequently, (4) turns into an optimization problem over APs' BF matrices and TRs' transmit powers.

Considering symmetric BF matrices, the number of BF weights which should be designed are $$\frac{M(M+1)}{2} \times L.$$

Hence, when either the number of antennas at APs, i.e., M, or the number of APs, i.e., L, are large, finding $$\frac{M(M+1)}{2} \times L$$

BF weights could be computationally prohibitive. Therefore, in the next step, towards obtaining the optimal BF matrices, a dimensionality reduction procedure that replaces $$\frac{M(M+1)}{2} \times L$$

BF weights is used which should be designed to be 3×L. Using this dimensionality reduction procedure, design steps become independent of the number of antennas employed in the APs. Consequently, the proposed method is efficiently applicable to the case when APs have a massive number of antennas.

In the description that follows, the steps of the various methods of inventive concepts are summarized by a very-high level algorithm, a high level description algorithm, and a detailed descriptive algorithm.

Very-High Level

In this embodiment, the total transmit power is minimized subject to the quality of service (QoS) constraints on TRs' data-rates in a bidirectional asynchronous cell free network where two TRs exchange their information using a number of AF-based APs. The consumed power in the network is the sum of the powers transmitted by the TRs and the transmitted powers of the Aps. The overall operations the TRs perform or that are performed on behalf of the TRs are below.

Step 1. Estimate channels between the transceivers and the APs. This operation of this step may be performed in all the algorithms.

Step 2. Calculate the total power consumption for each channel tap. (See steps 1-10 of high level description for detailed description of this step.)

Step 3. Find the single non-zero tap which results in the lowest total power consumption (See step 11 of high level description for detailed description of this step).

Step 4. Calculate the beamforming matrices for the APs (See steps 12 and 13 of high level description for detailed description of this step).

Step 5. Calculate the power transmission of each transceiver (See step 14 of high level description for detailed description of this step).

Step 6. Calculate the precoding (pre-equalizer) matrices at the at least two transceivers (See step 15 of high level description for detailed description of this step)

Step 7. Calculate the post-channel equalizers at the at least two transceivers (See step 16 of high level description for detailed description of this step)

High Level Description

Definitions for High level description algorithm and detailed descriptive algorithm:

$N_s$: number of symbols per transmitted block $r_1$: minimum required data rate at transceiver 1

$r_2$: minimum required data rate at transceiver 2

$\tau_l$: the end-to-end propagation delay between TR1 and TR2 through $AP_l$ with $\tau_1 \leq \tau_2 \leq \tau_3 \leq \ldots \leq \tau_l$ $L_c$: the discrete-time end-to-end multi-tap channel length $$L_C = 1 + \left\lceil \frac{\tau_L}{T_s} \right\rceil$$

$\mathcal{C}_{n+1}$: the set of those APs (relays) which contribute to the tap n of the end-to-end channel impulse response (CIR).

$\mathcal{N}$: set of those tap indices to which at least one AP (relay) contributes.

$1_n$: number of the APs (relays) which contribute to tap n of the end-to-end channel impulse response (CIR).

$i_n$: number of the APs (relays) which contribute to taps 0 to n−1 of the end-to-end channel impulse response (CIR).

$i'_n$:

number of the APs (relays) which contribute to taps n+1 to $L_c-1$ of the end-to-end channel impulse response (CIR).

$g_{l,1}$: channel vector between transceiver 1 and the l-th AP (relay)

$g_{l,2}$: channel vector between transceiver 2 and the l-th AP (relay)

$U_l$: an M×2 matrix with orthogonal columns which spans the subspace spanned by $g_{l,1}$, $g_{l,2}$ $$\hat{g}_{l,1} = U_l^T g_{l,1}^* \text{ and } \hat{g}_{l,2} = U_l^T g_{l,2}^*$$

$A_l$: beamforming matrix of the l-th AP (relay)
$P_1$: transmit power of transceiver 1
$P_2$: transmit power of transceiver 2
$E_1$: precoder matrix of transceiver 1
$E_2$: precoder matrix of transceiver 2
$F_1$: post-equalizer matrix of transceiver 1
$F_2$: post-equalizer matrix of transceiver 2

$$T = \begin{bmatrix} 1 & 0 & 0 \\ 0 & 1 & 0 \\ 0 & 1 & 0 \\ 0 & 0 & 1 \end{bmatrix}.$$

Initialization

Set $r'_1 = N_s(2^{r_1/N_s} - 1)$, $r'_2 = N_s(2^{r_2/N_s} - 1)$, and $\mu = (r'_1 + r'_2)/N_s$.

| Operations |
| --- |
| 1) Set n = 0. |
| 2) If $C_{n+1} = \emptyset$, go to Step 4; |
| 3) Assuming only those APs (relays) which contribute to the n-th tap of the end-to-end channel impulse response (CIR), are turned on while the remainder of the relays (APs) are turned off, calculate the total power consumption, denoted as $K_n$, in the network along with two parameters $z_n$ and $\lambda_n$, as detailed out in Steps 4-10 of detailed algorithm description. |
| 4) Set n = n + 1. If $n \leq L_C - 1$ go to step 2; otherwise go to step 5. |
| 5) 5) Calculate $n^\circ = \underset{n \in \mathcal{N}}{\mathrm{argmin}} K_n$. |
| 6) Calculate $$a^\circ = \beta \begin{bmatrix} 0^T_{M^2 i_{n^\circ} \times 1} & k^T & 0^T_{M^2 i'_{n^\circ} \times 1} \end{bmatrix}^T$$ where $$k = blk\mathrm{diag}\{U_l^* \otimes U_l^*\}_{l=i_{n^\circ}+1}^{i_{n^\circ}+l_{n^\circ}} (I_{l_{n^\circ}} \otimes T) S_{n^\circ}^{-1} (\lambda_{n^\circ}(z_{n^\circ}), z_{n^\circ}) \tilde{r}_{n^\circ+1}$$ |

-continued

| Operations |
| --- |

$$\beta = \sqrt{\cfrac{\mu}{\lambda_{n^\circ}(z_{n^\circ})\hat{r}^H_{n^\circ+1}\left(\mu\tilde{Q}^{n^\circ}_2\left(z_{n^\circ}\tilde{Q}^{n^\circ}_1+\tilde{T}_{n^\circ}\right)^{-1/2}+\right.}}$$
$$\sqrt{\left.\lambda_{n^\circ}(z_{n^\circ})\left(z_{n^\circ}\tilde{Q}^{n^\circ}_1+\tilde{T}_{n^\circ}\right)^{+1/2}\right)^{-2}\hat{r}_{n^\circ+1}}$$

$$\hat{r}_{n^\circ+1}\left(I_{l_{n^\circ}}\otimes T^T\right)\begin{bmatrix} \hat{g}^T_{(i_{n^\circ}+1),1}\otimes & \hat{g}^T_{(i_{n^\circ}+2),1}\otimes & & \hat{g}^T_{(i_{n^\circ}+l_{n^\circ}),1}\otimes \\ \hat{g}^T_{(i_{n^\circ}+1),2} & \hat{g}^T_{(i_{n^\circ}+2),2} & \cdots & \hat{g}^T_{(i_{n^\circ}+l_{n^\circ}),2} \end{bmatrix}^T$$

and $$S_n(\lambda, z) = \mu\tilde{Q}^n_2 + \lambda\left(z\tilde{Q}^n_2 + \tilde{T}_n\right)$$

$$\tilde{T}_n = I_{l_n}\otimes\text{diag}\{1, 2, 1\}$$

$$\tilde{Q}^n_1 = blk\text{diag}\{T^T\left(\left(\hat{g}_{l,1}\hat{g}^H_{l,1}\right)\otimes I_2\right)T\}^{i_n+l_n}_{l=i_n+1}$$

$$\tilde{Q}^n_2 = blk\text{diag}\{T^T\left(\left(\hat{g}_{l,2}\hat{g}^H_{l,2}\right)\otimes I_2\right)T\}^{i_n+l_n}_{l=i_n+1}$$

7) Reshape $a^\circ$ to obtain the optimal value of the BF matrices of $A_1, A_2, \ldots, A_L$ from $$a^\circ = [vec^T(A_1)\ \ vec^T(A_2)\ \ \ldots\ \ vec^T(A_L)]^T$$

8) Calculate the optimal TRs' transmit powers as:

$$p_1 = \frac{\sigma^2 r'_2}{N_s}\left(1 + \frac{k^H blk\text{diag}\{(g^*_{l,2}g^T_{l,2})\otimes I_M\}^{i_{n^\circ}+l_{n^\circ}}_{l=i_{n^\circ}+1}k}{k^H r*r^T k}\right)$$

$$p_2 = \frac{\sigma^2 r'_1}{N_s}\left(1 + \frac{k^H blk\text{diag}\{(g^*_{l,1}g^T_{l,1})\otimes I_M\}^{i_{n^\circ}+l_{n^\circ}}_{l=i_{n^\circ}+1}k}{k^H r*r^T k}\right)$$

where $$r = \left[\ g^T_{(i_{n^\circ}+1),1}\otimes g^T_{(i_{n^\circ}+1),2}\ \ \ g^T_{(i_{n^\circ}+2),1}\otimes g^T_{(i_{n^\circ}+2),2}\ \ \cdots\ \ g^T_{(i_{n^\circ}+l_{n^\circ}),1}\otimes g^T_{(i_{n^\circ}+l_{n^\circ}),2}\ \right]^T$$

9) Choose the precoding matrices $E_1, E_2$ to be any two unitary matrices.
10) Choose $F_1 = E_1{}^H, F_2 = E_2{}^H$.

Detailed Descriptive Algorithm
Initialization

Set $r'_n = N_s\left(2^{r_1/N_s} - 1\right)$, $r'_2 = N_s\left(2^{r_2/N_s} - 1\right)$, and $\mu = (r'_1 + r'_2)/N_s$.

Define set $\mathcal{N} = \{0 \leq n \leq L_c-1 | \mathcal{C}_{n+1} \neq 0\}$, as the set of indices of those taps of the end-to-end CIR to which at least one relay contributes.
Define $\mathcal{C}_{n+1}$, based on (2), and calculate $$l_n \in |\mathcal{C}_{n+1}|, i_n = \sum_{m=0}^{n-1} l_m, \text{ and}$$

$$i'_n = L - i_n - l_n \text{ for } n \in \{0, 1, \ldots, L_C - 1\}.$$

$$\text{Obtain } U_l = \left[\ \frac{g_{l1}}{\|g_{l1}\|}\ \ \frac{g_{l2} - \frac{g^H_{l1}g_{l2}}{\|g_{l1}\|}g_{l1}}{\left\|g_{l2} - \frac{g^H_{l1}g_{l2}}{\|g_{l1}\|}g_{l1}\right\|}\ \right],$$

$$\hat{g}_{l1} = U_l^T g^*_{l1} \text{ and } \hat{g}_{l2} = U_l^T g^*_{l2} \text{ for } l = 1, 2, \ldots, L.$$

$$\text{Define } T = \begin{bmatrix} 1 & 0 & 0 \\ 0 & 1 & 0 \\ 0 & 1 & 0 \\ 0 & 0 & 1 \end{bmatrix}.$$

---

Operations

---

1) Set n = 0.
2) If $C_{n+1} = \emptyset$, go to Step 10;
3) Calculate $$\tilde{T}_n = I_{i_n} \otimes \operatorname{diag}\{1, 2, 1\}$$

$$\tilde{Q}_1^n = blk\operatorname{diag}\{T^T((\hat{g}_{l1}\hat{g}_{l1}^H) \otimes I_2)T\}_{l=i_n+1}^{i_n+l_n}$$

$$\tilde{Q}_2^n = blk\operatorname{diag}\{T^T((\hat{g}_{l2}\hat{g}_{l2}^H) \otimes I_2)T\}_{l=i_n+1}^{i_n+l_n}$$

$$\tilde{r}_{n+1}(I_{i_n} \otimes T^T)\begin{bmatrix} \hat{g}_{(i_n+1)1}^T \otimes & \hat{g}_{(i_n+2)1}^T \otimes & & \hat{g}_{(i_n+l_n)1}^T \otimes \\ \hat{g}_{(i_n+1)2}^T & \hat{g}_{(i_n+2)2}^T & \cdots & \hat{g}_{(i_n+l_n)2}^T \end{bmatrix}^T$$

4) Define $$S_n(\lambda, z) = \mu\tilde{Q}_2^n + \lambda(z\tilde{Q}_2^n + \tilde{T}_n)$$

$$h_n(z) = \frac{\frac{1}{z^2} - \lambda\tilde{r}_{n+1}^H S_n^{-1}(\lambda, z)\tilde{Q}_1^n S_n^{-1}(\lambda, z)\tilde{r}_{n+1}}{\lambda\tilde{r}_{n+1}^H S_n^{-1}(\lambda, z)(z\tilde{Q}_1^n + \tilde{T}_n)S_n^{-1}(\lambda, z)\tilde{r}_{n+1}} - \frac{1}{\mu}$$

Note: for any z > 0, the value of λ is obtained, using a bisection method, as the unique positive solution to the following non-linear equation:

$$z\tilde{r}_{n+1}^H S_n^{-1}(\lambda, z)\tilde{r}_{n+1} - 1 = 0 \qquad (5)$$

5) Set $z_l > 0$ small enough such that $\hbar_n(z_l) < 0$, and solve (5) to find A associated to $z_l$. Set $z_u > 0$ large enough such that $\hbar_n(z_u) > 0$, and solve (5) to find A associated to $z_u$.

6) Set $z = \dfrac{z_l + z_u}{2}$, and solve (5) to find λ associated to z.

7) If $\hbar_n(z) < \epsilon$ go to step 8; otherwise,
   If $\hbar_n(z_l) < 0$, set $z_l = z$ and solve (5) to find λ associated to $z_u$, then go to step 6.
   else if set $z_u = z$ and solve (5) to find λ associated to $z_l$, then go to step 6.
   Not: ε determines the precision of the bisection method
8) Solve (5) to find λ associated to z, then set $z_n = z$ and set $\lambda_n = \lambda$.

9) Calculate $K_n = z_n + \dfrac{\mu}{\lambda_n}$.

10) Set n = n + 1. If $n \leq L_C - 1$ go to step 2; otherwise go to step 11.
11) 11) Calculate $n^\circ = \underset{n \in N}{\operatorname{argmin}} K_n$.
12) Calculate $$a^\circ = \beta\begin{bmatrix} 0_{M^2 i_{n^\circ} \times 1}^T & k^T & 0_{M^2 i'_{n^\circ} \times 1}^T \end{bmatrix}^T$$

where $$k = blk\operatorname{diag}\{U_l^* \otimes U_l^*\}_{l=i_{n^\circ}+1}^{i_{n^\circ}+l_{n^\circ}}(I_{i_{n^\circ}} \otimes T)S_{n^\circ}^{-1}(\lambda_{n^\circ}(z_{n^\circ}), z_{n^\circ})\tilde{r}_{n^\circ+1}$$

$$\beta = \sqrt{\frac{\mu}{\lambda_{n^\circ}(z_{n^\circ})\tilde{r}_{n^\circ+1}^H\left(\mu\tilde{Q}_2^{n^\circ}\left(z_{n^\circ}\tilde{Q}_1^{n^\circ} + \tilde{T}_{n^\circ}\right)^{-1/2} + \lambda_{n^\circ}(z_{n^\circ})\left(z_{n^\circ}\tilde{Q}_1^{n^\circ} + \tilde{T}_{n^\circ}\right)^{+1/2}\right)^{-2}\tilde{r}_{n^\circ+1}}}$$

13) Reshape a° to obtain the optimal value of the BF matrices of $A_1, A_2, \ldots, A_L$ from $$a^\circ = [vec^T(A_1) \quad vec^T(A_2) \quad \ldots \quad vec^T(A_L)]^T$$

14) Calculate the optimal TRs' transmit powers as:

$$p_1 = \frac{\sigma^2 r_2'}{N_s^2}(1 + \frac{k^H blk\operatorname{diag}\{(g_{l,2}^* g_{l,2}^T) \otimes I_M\}_{l=i_{n^\circ}+1}^{i_{n^\circ}+l_{n^\circ}} k}{k^H r * r^T k})$$

$$p_2 = \frac{\sigma^2 r_1'}{N_s^2}(1 + \frac{k^H blk\operatorname{diag}\{(g_{l,1}^* g_{l,1}^T) \otimes I_M\}_{l=i_{n^\circ}+1}^{i_{n^\circ}+l_{n^\circ}} k}{k^H r * r^T k})$$

-continued

| Operations |
| --- | where $$r = \left[ \begin{array}{cccc} g^T_{(i_{n^\circ}+1),1} \otimes & g^T_{(i_{n^\circ}+2),1} \otimes & & g^T_{(i_{n^\circ}+l_{n^\circ}),1} \otimes \\ g^T_{(i_{n^\circ}+1),2} & g^T_{(i_{n^\circ}+2),2} & \cdots & g^T_{(i_{n^\circ}+l_{n^\circ}),2} \end{array} \right]^T$$

15) Choose the precoding matrices $E_1$, $E_2$ to be any two unitary matrices.
16) Choose $F_1 = E_1{}^H$, $F_2 = E_2{}^H$.

System Embodiment 1—Single Carrier-Implementation

Figures 7, 8:
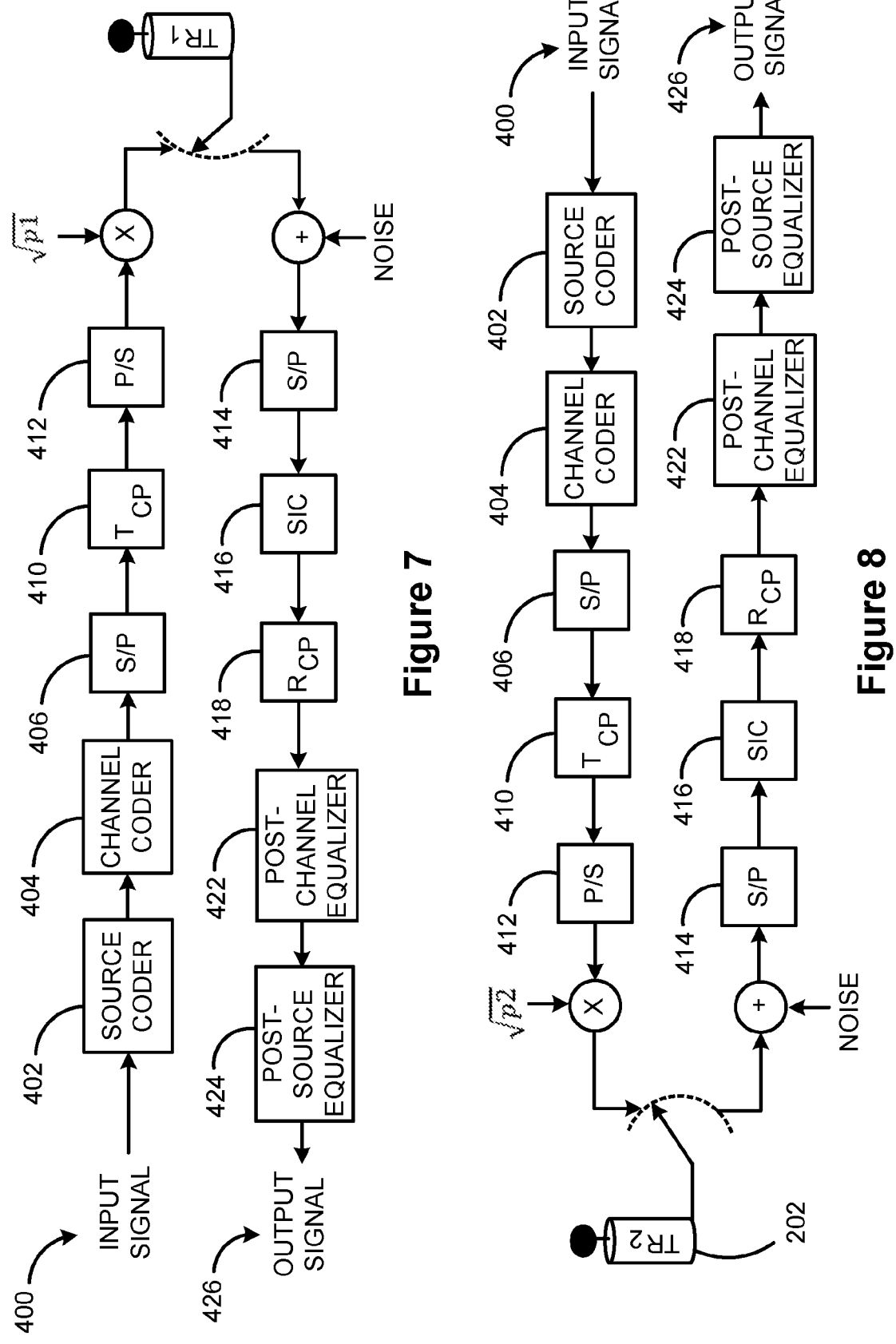
FIG. 7 is a block diagram illustrating a structure of a first transceiver in a single-carrier implementation according to some embodiments of inventive concepts.
FIG. 8 is a block diagram illustrating a structure of a second transceiver in a single-carrier implementation according to some embodiments of inventive concepts.

A single-carrier implementation of the proposed network is considered as embodiment #1. To have the optimal performance the pre-channel equalizers should be unitary matrices and post-channel equalizers should be invertible matrices. Thus, for a single-carrier implementation of the proposed system, an Identity matrix is one simple choice for both the pre- and post-channel equalizers. The detailed structures of TR1 and TR2 for single-carrier implementation are depicted in FIG. 7 and FIG. 8, respectively.

System Embodiment 2—Multi-Carrier Implementation

Figures 9, 10:
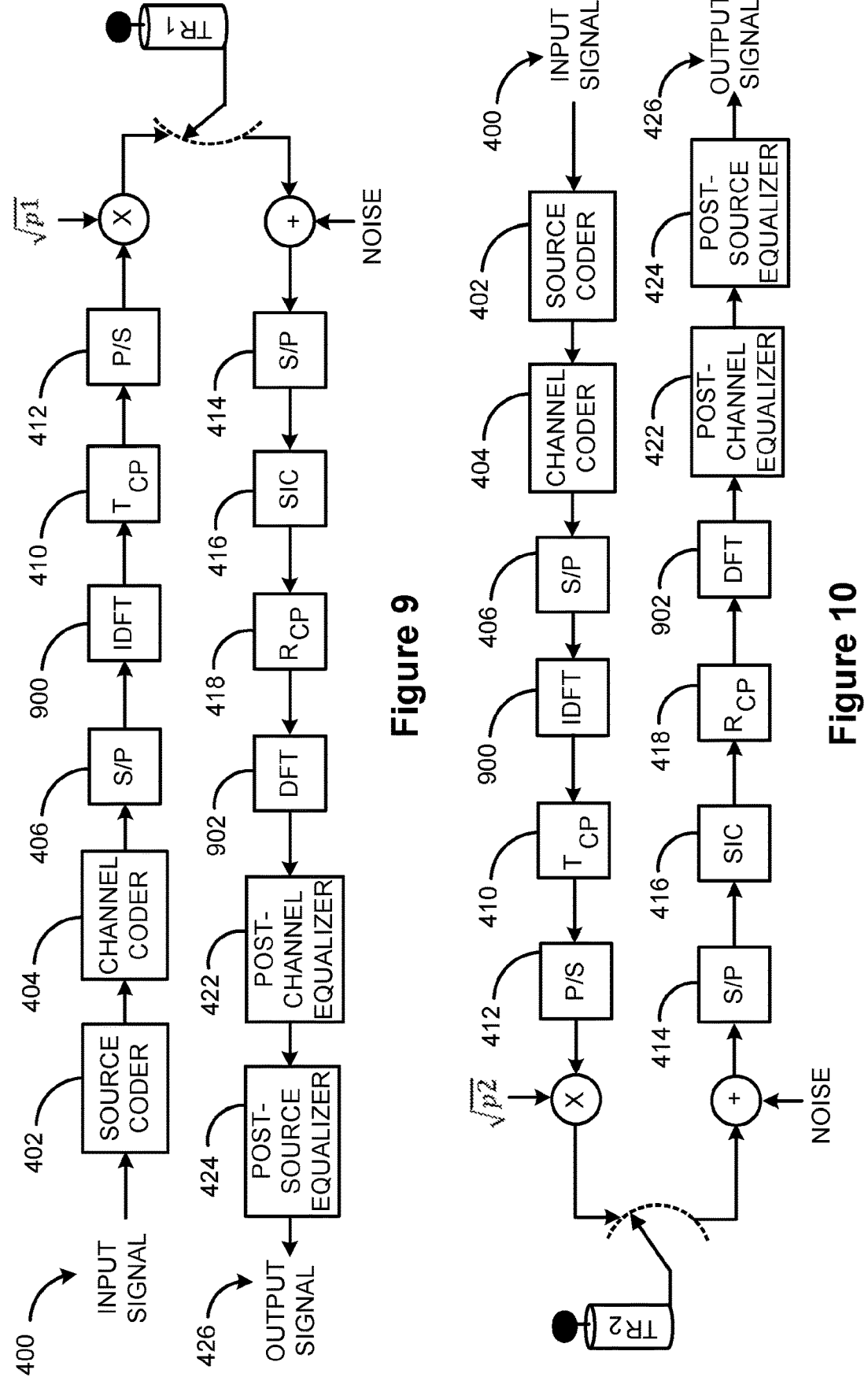
FIG. 9 is a block diagram illustrating a structure of a first transceiver in a multi-carrier implementation according to some embodiments of inventive concepts.
FIG. 10 is a block diagram illustrating a structure of a second transceiver in a multi-carrier implementation according to some embodiments of inventive concepts.

A multi-carrier implementation of the network is considered as embodiment #2, and its details are illustrated in FIG. 9 and FIG. 10. As mentioned, pre-channel equalizers should be unitary and post-channel equalizers should be invertible matrices. Thus, for a multi-carrier implementation of the proposed system, the pre-equalizers are set to be inverse discrete Fourier transform (IDFT) matrix 900, and the post-equalizers are set to be discrete Fourier transform (DFT) matrix 902. The detailed structures of TR1 and TR2 for multi-carrier implementation are depicted in FIG. 9 and FIG. 10, respectively.

Operations of the transceiver device 202 (implemented using the structure of the block diagram of FIG. 3) will now be discussed with reference to the flow chart of FIG. 11 according to some embodiments of inventive concepts. For example, modules may be stored in memory 305 of FIG. 3, and these modules may provide instructions so that when the instructions of a module are executed by respective communication device processing circuitry 303, processing circuitry 303 performs respective operations of the flow chart.

FIG. 11 illustrates operations the transceiver device 202 performs to minimize a total transmit power in a bidirectional asynchronous cell free network where at least two transceivers, TRs, exchange their information using a number of amplify and forward, AF, based access points, APs, the total transmit power subject to quality of service, QoS constraints on data-rates of the TRs. Turning to FIG. 11, in block 1101, the processing circuitry 303 estimates channels between the at least two TRs and the AF-based APs.

In block 1103, the processing circuitry 303 calculates a total power consumption for each channel tap. In some embodiments, the processing circuitry 303 calculates the total power consumption for each channel tap by calculating the total power consumption in the network for the channel tap based on only those APs which contribute to the n-th tap of an end-to-end channel impulse response, CIR, are turned on while a remainder of the APs are turned off.

In various of these embodiments, the processing circuitry 303 calculates the total power consumption by initializing variables, defining variables, and performing various calculations. For example, the processing circuitry 303 initializes variables $$r'_1, r'_2,$$

and $\mu$ in accordance with $$r'_1 = N_s(2^{r_1/N_s} - 1), r'_2 = N_s(2^{r_2/N_s} - 1), \text{ and } \mu = (r'_1 + r'_2)/N_s,$$

where $r_1$ is a minimum required data rate at a first of the at least two TRs, $TR_1$, $r_2$ is a minimum required data rate at a second of the at least two TRs, $TR_2$, and $N_s$ is a number of symbols per transmitted block.

In these embodiments, the processing circuitry 303 defines set $\mathcal{N} = \{0 \le n \le L_c - 1 \mid \mathcal{C}_{n+1} \ne 0\}$, as the set of indices of those taps of the end-to-end CIR to which at least one AP contributes, wherein $\mathcal{C}_{n+1}$ is a set of those APs which contribute to the tap n of the end-to-end CIR and $L_c$, is a discrete-time end-to-end multi-tap channel length, $L_c$, as $$L_C = 1 + \left\lceil \frac{\tau_l}{T_s} \right\rceil,$$

wherein $\tau_l$ is an end-to-end propagation delay between TR1 and TR2 through $AP_l$ with $\tau_1 \le \tau_2 \le \tau_3 \le \ldots \le \tau_l$, and Ts is a symbol period.

In these embodiments, the processing circuitry 303 calculates various parameters. The processing circuitry 303 calculates $$l_n \in |\hat{\mathcal{C}}_{n+1}|, i_n = \sum_{m=0}^{n-1} l_m, \text{ and}$$
$$i'_n = L - i_n - l_n \text{ for } n \in \{0, 1, \ldots, L_C - 1\}.$$

The processing circuitry 303 calculates $$\hat{T}_n, \tilde{Q}_1^n, \tilde{Q}_2^n, \text{ and } \hat{r}_{n+1}$$

in accordance with $$T = \begin{bmatrix} 1 & 0 & 0 \\ 0 & 1 & 0 \\ 0 & 1 & 0 \\ 0 & 0 & 1 \end{bmatrix}$$

$$\tilde{T}_n = I_{i_n} \otimes \mathrm{diag}\{1, 2, 1\},$$

$$\tilde{Q}_1^n = blkdiag\{T^T((\hat{g}_{l1}\hat{g}_{l1}^H) \otimes I_2)T\}_{l=i_n+1}^{i_n+l_n},$$

$$\tilde{Q}_2^n = blkdiag\{T^T((\hat{g}_{l2}\hat{g}_{l2}^H) \otimes I_2)T\}_{l=i_n+1}^{i_n+l_n}$$

$$\hat{r}_{n+1} =$$

$$(I_{i_n} \otimes T^T)\left[\hat{g}_{(i_n+1)1}^T \otimes \hat{g}_{(i_n+1)2}^T \quad \hat{g}_{(i_n+2)1}^T \otimes \hat{g}_{(i_n+2)2}^T \quad \cdots \quad \hat{g}_{(i_n+l_n)1}^T \otimes \hat{g}_{(i_n+l_n)2}^T\right]^T.$$

The processing circuitry 303 defines $S_n(\lambda, z)$ and $\hbar_n(z)$ in accordance with $$S_n(\lambda, z) = \mu\tilde{Q}_2^n + \lambda(z\tilde{Q}_2^n + \tilde{T}_n) \text{ and}$$

$$\hbar_n(z) = \frac{\frac{1}{z^2} - \lambda\hat{r}_{n+1}^H S_n^{-1}(\lambda, z)\tilde{Q}_1^n S_n^{-1}(\lambda, z)\hat{r}_{n+1}}{\lambda\hat{r}_{n+1}^H S_n^{-1}(\lambda, z)(z\tilde{Q}_1^n + \tilde{T}_n)S_n^{-1}(\lambda, z)\hat{r}_{n+1}} - \frac{1}{\mu}$$

The processing circuitry 303 sets $z_l > 0$ small enough such that $\hbar_n(z_l) < 0$, and solves $$z\hat{r}_{n+1}^H S_n^{-1}(\lambda, z)\hat{r}_{n+1} - 1 = 0$$

to find $\lambda$ associated to $z_l$. using a bisection method, as the unique positive solution to $$z\hat{r}_{n+1}^H S_n^{-1}(\lambda, z)\hat{r}_{n+1} - 1 = 0.$$

The processing circuitry 303 sets $z_u > 0$ large enough such that $\hbar_n(z_l) > 0$, and solves $$z\hat{r}_{n+1}^H S_n^{-1}(\lambda, z)\hat{r}_{n+1} - 1 = 0$$

to find $\lambda$ associated to $z_u$. using the bisection method, as the unique positive solution to $$z\hat{r}_{n+1}^H S_n^{-1}(\lambda, z)\hat{r}_{n+1} - 1 = 0.$$

The processing circuity 303 responsive to $\hbar_n(z) < \epsilon$, sets $$z = \frac{z_l + z_u}{2}$$

and solves $$z\hat{r}_{n+1}^H S_n^{-1}(\lambda, z)\hat{r}_{n+1} - 1 = 0$$

to find $\lambda$ associated to z, and sets $z_n = z$ and sets $\lambda_n = \lambda$, wherein $\epsilon$ determines a precision of the bisection method.

The processing circuitry 303 calculating the total power consumption in the network for the channel tap in accordance with $$K_n = z_n + \frac{\mu}{\lambda_n}$$

where $K_n$ is the total power consumption for the channel tap$_n$.

$\hbar_n(z)$ may not be $< \epsilon$. The processing circuitry 303, responsive to $$\hbar_n(z) < 0: \text{ sets } z_l = z, \text{ solves } z\hat{r}_{n+1}^H S_n^{-1}(\lambda, z)\hat{r}_{n+1} - 1 = 0$$

to find $\lambda$ associated to $z_u$, and sets $$z = \frac{z_l + z_u}{2},$$

and solves $$z\hat{r}_{n+1}^H S_n^{-1}(\lambda, z)\hat{r}_{n+1} - 1 = 0$$

to find $\lambda$ associated to z. The processing circuitry 303, responsive to $$\hbar_n(z) > 0: \text{ sets } z_u = z, \text{ solves } z\hat{r}_{n+1}^H S_n^{-1}(\lambda, z)\hat{r}_{n+1} - 1 = 0$$

to find $\lambda$ associated to $z_l$, sets $$z = \frac{z_l + z_u}{2},$$

and solves $$z\hat{r}_{n+1}^H S_n^{-1}(\lambda, z)\hat{r}_{n+1} - 1 = 0$$

to find $\lambda$ associated to z. This process in some embodiments repeats these operations until $\hbar_n(z) < \epsilon$ before proceeding to calculate the total power consumption in the network for the channel tap in accordance with $$K_n = z_n + \frac{\mu}{\lambda_n}$$

Returning to FIG. 11, in block 1103, the processing circuitry 303 determines a single non-zero channel tap which results in a lowest total power consumption. Based on this single non-zero channel tap, various matrices, transceiver power transmission setting, and post-channel equalizers can be determined. In some embodiments, the processing circuitry 303 determines the single non-zero channel tap which results in a lowest total power consumption by determining the single non-zero channel tap in accordance with $$n^\circ = \arg\min_{n \in \mathcal{N}} K_n$$

wherein $K_n$ is the total power consumption for channel tap$_n$.

Returning to FIG. 11, in block 1107, the processing circuitry 303 calculates beamforming matrices for the APs. In various embodiments, the processing circuitry 303 calculates the beamforming matrices by calculating $$a^\circ = \beta \left[ 0^T_{M^2 i_{n^\circ} \times 1} \quad k^T \quad 0^T_{M^2 i'_{n^\circ} \times 1} \right]^T$$

where $$\beta = \frac{k = blk\mathrm{diag}\{U_l^* \otimes U_l^*\}_{l=i_{n^\circ}+1}^{i_{n^\circ}+l_{n^\circ}} (I_{l_{n^\circ}} \otimes T) S_{n^\circ}^{-1} (\lambda_{n^\circ}(z_{n^\circ}), z_{n^\circ}) \tilde{r}_{n^\circ+1}}{(\mu)} \left\vert\left\vert \left( \lambda_{n^\circ}(z_{n^\circ}) \tilde{r}_{n^\circ+1}^H \left( \mu \tilde{Q}_2^{n^\circ} \left( z_{n^\circ} \tilde{Q}_1^{n^\circ} + \tilde{T}_{n^\circ} \right)^{-\frac{1}{2}} + \right. \right. \right. \\ \left. \left. \left. \lambda_{n^\circ}(z_{n^\circ}) \left( z_{n^\circ} \tilde{Q}_1^{n^\circ} + \tilde{T}_{n^\circ} \right)^{+\frac{1}{2}} \right)^{-2} \tilde{r}_{n^\circ+1} \right) \right\vert\right\vert$$

and reshaping $a^\circ$ to obtain the optimal value of the BF matrices of $A_1, A_2, \ldots, A_L$ from $$a^\circ = \left[ vec^T(A_1) \quad vec^T(A_2) \quad \ldots \quad vec^T(A_L) \right]^T$$

wherein $U_l$ is an M×2 matrix with orthogonal columns which spans the subspace spanned by $g_{l,1}$, $g_{l,2}$ wherein the at least two TRs comprise two TRs, $g_{l,1}$ is a channel vector between TR1 and the l-th AP, and $g_{l,2}$ is a channel vector between TR2 and the l-th AP as described above.

In some of these embodiments, the processing circuitry 303 determines $U_l$ in accordance with $$U_l = \left[ \frac{g_{l1}}{\Vert g_{l1} \Vert} \quad \frac{g_{l2} - \frac{g_{l1}^H g_{l2}}{\Vert g_{l1} \Vert} g_{l1}}{\left\Vert g_{l2} - \frac{g_{l1}^H g_{l2}}{\Vert g_{l1} \Vert} g_{l1} \right\Vert} \right],$$

$$\hat{g}_{l1} = U_l^T g_{l1}^* \text{ and } \hat{g}_{l2} = U_l^T g_{l2}^* \text{ for } l = 1, 2, \ldots, L.$$

Returning to FIG. 11, in block 1109, the processing circuitry calculates a total power transmission of each transceiver of the at least two transceivers. In various embodiments, the processing circuitry 303 calculates the total power transmission of each transceiver by calculating the total power transmission in accordance with $$p_1 = \frac{\sigma^2 r'_2}{N_s^2} \left( 1 + \frac{k^H blk\mathrm{diag}\{(g_{l,2}^* g_{l,2}^T) \otimes I_M\}_{l=i_{n^\circ}+1}^{i_{n^\circ}+l_{n^\circ}} k}{k^H r^* r^T k} \right)$$

$$p_2 = \frac{\sigma^2 r'_1}{N_s^2} \left( 1 + \frac{k^H blk\mathrm{diag}\{(g_{l1}^* g_{l1}^T) \otimes I_M\}_{l=i_{n^\circ}+1}^{i_{n^\circ}+l_{n^\circ}} k}{k^H r^* r^T k} \right)$$

where $$r = \left[ g^T_{(i_{n^\circ}+1),1} \otimes g^T_{(i_{n^\circ}+1),2} \quad g^T_{(i_{n^\circ}+2),1} \otimes g^T_{(i_{n^\circ}+2),2} \quad \cdots \quad g^T_{(i_{n^\circ}+l_{n^\circ}),1} \otimes g^T_{(i_{n^\circ}+l_{n^\circ}),2} \right]^T, p_1$$

is the total power transmission of TR1 and $p_2$ is the total power transmission of TR2.

In block 1111, the processing circuitry 303 calculates precoding matrices at each transceiver of the at least two transceivers. In various embodiments, the processing circuitry 303 calculates the precoding matrices at each transceiver by selecting precoding matrices $E_1$, $E_2$ to be any two unitary matrices, wherein $E_1$ is a precoder matrix of a first transceiver, TR1, of the at least two transceivers TR1 and $E_2$ is a precoder matrix of a second transceiver, TR2, of the at least two transceivers.

In block 1113, the processing circuitry 303 calculates post-channel equalizers at the at least two transceivers. In various embodiments, the processing circuitry 303 calculates post-channel equalizers at the at least two transceivers by selecting $$F_1 = E_1^H, F_2 = E_2^H,$$

wherein $F_1$ is a post-equalizer matrix of TR1 and $F_2$ is a post-equalizer matrix of TR2.

Various operations from the flow chart of FIG. 11 may be optional with respect to some embodiments of transceiver devices and related methods. Regarding methods of example embodiment 1 (set forth below), for example, operations of block 1101 of FIG. 11 may be optional.

Although the computing devices described herein (e.g., transceiver devices, access points, etc.) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method to minimize a total transmit power in a bidirectional asynchronous cell free network where at least two transceivers, TRs, exchange their information using a number of amplify and forward, AF, based access points, APs, the total transmit power subject to quality of service, QoS constraints on data-rates of the TRs, the method comprising:

estimating channels between the at least two TRs and the AF-based APs;

calculating a total power consumption for each channel tap;

determining a single non-zero channel tap which results in a lowest total power consumption;

based on the single non-zero channel tap determined:

calculating beamforming matrices for the APs;

calculating a total power transmission of each transceiver of the at least two transceivers;

calculating precoding matrices at each transceiver of the at least two transceivers; and calculating post-channel equalizers at the at least two transceivers.

2. The method of claim 1, wherein calculating the total power consumption for each channel tap comprises:

calculating the total power consumption in the network for the channel tap based on only those APs which contribute to the n-th tap of an end-to-end channel impulse response, CIR, are turned on while a remainder of the APs are turned off.

3. The method of claim 1, wherein calculating precoding matrices at each transceiver of the at least two transceivers comprises selecting precoding matrices $E_1$, $E_2$ to be any two unitary matrices, wherein $E_1$ is a precoder matrix of a first transceiver, TR1, of the at least two transceivers and $E_2$ is a precoder matrix of a second transceiver, TR2, of the at least two transceivers.

4. The method of claim 3, wherein calculating post-channel equalizers at the at least two transceivers comprises selecting $$F_1 = E_1^H, F_2 = E_2^H,$$

wherein $F_1$ is a post-equalizer matrix of TR1 and $F_2$ is a post-equalizer matrix of transceiver 2.

5. The method of claim 1, wherein calculating the total power consumption in the network for the channel tap comprises:

initializing variables $$r_1', r_2', \text{ and } \mu$$

24 in accordance with $$r_1' = N_s\left(2^{r_1/N_s} - 1\right), r_2' = N_s\left(2^{r_2/N_s} - 1\right), \text{ and } \mu = (r_1' + r_2')/N_s,$$

where $r_1$ is a minimum required data rate at a first of the at least two TRs, $TR_1$, $r_2$ is a minimum required data rate at a second of the at least two TRs, $TR_2$, and $N_s$ is a number of symbols per transmitted block;

defining set $\mathcal{N} = \{0 \leq n \leq L_c - 1 \mid \mathcal{C}_{n+1} \neq 0\}$, as the set of indices of those taps of the end-to-end CIR to which at least one AP contributes, wherein $\mathcal{C}_{n+1}$ is a set of those APs which contribute to the tap n of the end-to-end CIR and $L_c$, is a discrete-time end-to-end multi-tap channel length, $L_c$, as $$L_C = 1 + \left\lceil \frac{\tau_l}{T_s} \right\rceil,$$

wherein $\tau_l$ is an end-to-end propagation delay between TR1 and TR2 through $AP_l$ with $\tau_1 \leq \tau_2 \leq \tau_3 \leq \ldots \leq \tau_l$, and Ts is a symbol period;

calculating $$l_n = \left|\mathcal{C}_{n+1}\right|, i_n = \sum_{m=0}^{n-1} l_m, \text{ and}$$

$$i_n' = L - i_n - l_n \text{ for } n \in \{0, 1, \ldots, L_C - 1\};$$

calculating $$\tilde{T}_n, \tilde{Q}_1^n, \tilde{Q}_2^n, \text{ and } \hat{r}_{n+1}$$

in accordance with $$T = \begin{bmatrix} 1 & 0 & 0 \\ 0 & 1 & 0 \\ 0 & 1 & 0 \\ 0 & 0 & 1 \end{bmatrix}$$

$$\tilde{T}_n = I_{l_n} \otimes \text{diag}\{1, 2, 1\},$$

$$\tilde{Q}_1^n = blk\text{diag}\{T^T\left(\left(\hat{g}_{l1}\hat{g}_{l1}^H\right) \otimes I_2\right)T\}_{l=i_n+1}^{i_n+l_n},$$

$$\tilde{Q}_2^n = blk\text{diag}\{T^T\left(\left(\hat{g}_{l2}\hat{g}_{l2}^H\right) \otimes I_2\right)T\}_{l=i_n+1}^{i_n+l_n}$$

$$\hat{r}_{n+1} =$$

$$\left(I_{l_n} \otimes T^T\right)\left[\hat{g}_{(i_n+1)1}^T \otimes \hat{g}_{(i_n+1)2}^T \quad \hat{g}_{(i_n+2)1}^T \otimes \hat{g}_{(i_n+2)2}^T \quad \cdots \quad \hat{g}_{(i_n+l_n)1}^T \otimes \hat{g}_{(i_n+l_n)2}^T\right]^T;$$

defining $S_n(\lambda, z)$ and $\hbar_n(z)$ in accordance with $$S_n(\lambda, z) = \mu \tilde{Q}_2^n + \lambda\left(z \tilde{Q}_2^n + \tilde{T}_n\right) \text{ and}$$

-continued $$\hbar_n(z) = \frac{\frac{1}{z^2} - \lambda\, \tilde{r}_{n+1}^H S_n^{-1}(\lambda, z)\tilde{Q}_2^n S_n^{-1}(\lambda, z)\tilde{r}_{n+1}}{\lambda\, \tilde{r}_{n+1}^H S_n^{-1}(\lambda, z)\left(z\tilde{Q}_2^n + \tilde{T}_n\right) S_n^{-1}(\lambda, z)\tilde{r}_{n+1}} - \frac{1}{\mu}$$

setting $z_l > 0$ small enough such that $\hbar_n(z_l) < 0$, and solving $$z\tilde{r}_{n+1}^H S_n^{-1}(\lambda, z)\tilde{r}_{n+1} - 1 = 0$$

to find $\lambda$ associated to $z_l$, using a bisection method, as the unique positive solution to $$z\tilde{r}_{n+1}^H S_n^{-1}(\lambda, z)\tilde{r}_{n+1} - 1 = 0;$$

setting $z_u > 0$ large enough such that $\hbar_n(z_l) > 0$, and solving $$z\tilde{r}_{n+1}^H S_n^{-1}(\lambda, z)\tilde{r}_{n+1} - 1 = 0$$

to find $\lambda$ associated to $z_u$, using the bisection method, as the unique positive solution to $$z\tilde{r}_{n+1}^H S_n^{-1}(\lambda, z)\tilde{r}_{n+1} - 1 = 0;$$

responsive to $\hbar_n(z) < \epsilon$, setting $$z = \frac{z_l + z_u}{2}$$

and solving $$z\tilde{r}_{n+1}^H S_n^{-1}(\lambda, z)\tilde{r}_{n+1} - 1 = 0$$

o find $\lambda$ associated to z, and setting $z_n = z$ and setting $\lambda_n = 1$, wherein $\epsilon$ determines a precision of the bisection method; and calculating the total power consumption in the network for the channel tap in accordance with $$K_n = z_n + \frac{\mu}{\lambda_n}$$

where $K_n$ is the total power consumption for the channel tap$_n$.

6. The method of claim 5, further comprising:
responsive to $\hbar_n(z) < 0$:
setting $z_l = z$
solving $$z\tilde{r}_{n+1}^H S_n^{-1}(\lambda, z)\tilde{r}_{n+1} - 1 = 0$$

to find $\lambda$ associated to $z_u$
setting $$z = \frac{z_l + z_u}{2},$$

and solving $$z\tilde{r}_{n+1}^H S_n^{-1}(\lambda, z)\tilde{r}_{n+1} - 1 = 0$$

to find $\lambda$ associated to z.

7. The method of claim 5, further comprising: responsive to $\hbar_n(z) > 0$:
setting $z_u = z$
solving $$z\tilde{r}_{n+1}^H S_n^{-1}(\lambda, z)\tilde{r}_{n+1} - 1 = 0$$

to find $\lambda$ associated to $z_l$ setting $$z = \frac{z_l + z_u}{2},$$

and solving $$z\tilde{r}_{n+1}^H S_n^{-1}(\lambda, z)\tilde{r}_{n+1} - 1 = 0$$

to find $\lambda$ associated to z.

8. The method of claim 1, wherein determining the single non-zero channel tap which results in a lowest total power consumption comprises determining the single non-zero channel tap in accordance with $$n^\circ = \arg\min_{n \in N} K_n$$

wherein $K_n$ is the total power consumption for channel tap$_n$.

9. The method of claim 1, wherein calculating the beamforming matrices for the APs comprises:
calculating $$a^\circ = \beta\left[0_{M^2 i_{n^\circ} \times 1}^T \quad k^T \quad 0_{M^2 i'_{n^\circ} \times 1}^T\right]^T$$

where $$k = blkdiag\{U_l^* \otimes U_l^*\}_{l=i_{n^\circ}+1}^{i_{n^\circ}+l_{n^\circ}}\left(I_{l_{n^\circ}} \otimes T\right) S_{n^\circ}^{-1}(\lambda_{n^\circ}(z_{n^\circ}), z_{n^\circ})\tilde{r}_{n^\circ+1}$$

$$\beta = \sqrt{\frac{\mu}{\lambda_{n^\circ}(Z_{n^\circ})\tilde{r}_{n^\circ+1}^H\left(\mu\bar{Q}_2^{n^\circ}\left(z_{n^\circ}\tilde{Q}_1^{n^\circ} + \tilde{T}_{n^\circ}\right)^{-\frac{1}{2}} + \lambda_{n^\circ}(z_{n^\circ})\left(z_{n^\circ}\tilde{Q}_1^{n^\circ} + \tilde{T}_{n^\circ}\right)^{+\frac{1}{2}}\right)^{-2}\tilde{r}_{n^\circ} + 1}}$$

and
reshaping $a^\circ$ to obtain the optimal value of the BF matrices of $A_1, A_2, \ldots, A_L$ from $$a^\circ = \begin{bmatrix} vec^T(A_1) & vec^T(A_2) & \dots & vec^T(A_L) \end{bmatrix}^T$$

wherein $U_l$ is an M×2 matrix with orthogonal columns which spans the subspace spanned by $g_{l,1}$, $g_{l,2}$ wherein the at least two TRs comprise two TRs, $g_{l,1}$ is a channel vector between TR1 and the l-th AP, and $g_{l,2}$ is a channel vector between TR2 and the l-th AP.

10. The method of claim 9, further comprising obtaining $U_l$ in accordance with $$U_l = \begin{bmatrix} \dfrac{g_{l1}}{\|g_{l1}\|} & \dfrac{g_{l2} - \dfrac{g_{l1}^H g_{l2}}{\|g_{l1}\|} g_{l1}}{\left\| g_{l2} - \dfrac{g_{l1}^H g_{l2}}{\|g_{l1}\|} g_{l1} \right\|} \end{bmatrix}, \hat{g}_{l1} = U_l^T g_{l1}^* \text{ and } \hat{g}_{l2} = U_l^T g_{l2}^* \text{ for }$$

$$l = 1, 2, \dots, L.$$

11. The method of claim 1, wherein calculating the total power transmission of each transceiver of the at least two transceivers comprises calculating the total power transmission in accordance with $$p_1 = \frac{\sigma^2 r_2'}{N_s^2}\left(1 + \frac{k^H blkdiag\{(g_{l,2}^* g_{l,2}^T) \otimes I_M\}_{l=i_{n^\circ}+1}^{i_{n^\circ}+l_{n^\circ}} k}{k^H r * r^T k}\right)$$

$$p_2 = \frac{\sigma^2 r_1'}{N_s^2}\left(1 + \frac{k^H blkdiag\{(g_{l,1}^* g_{l,1}^T) \otimes I_M\}_{l=i_{n^\circ}+1}^{i_{n^\circ}+l_{n^\circ}} k}{k^H r * r^T k}\right)$$

where $$r =$$

$$\begin{bmatrix} g_{(i_{n^\circ}+1),1}^T \otimes g_{(i_{n^\circ}+2),1}^T & g_{(i_{n^\circ}+2),1}^T \otimes g_{(i_{n^\circ}+2),2}^T & \cdots & g_{(i_{n^\circ}+l_{n^\circ}),1}^T \otimes g_{(i_{n^\circ}+l_{n^\circ}),2}^T \end{bmatrix}^T,$$

$$p_1$$

is the total power transmission of TR1 and p2 is the total power transmission of TR2.

12. A transceiver device for minimizing a total transmit power in a bidirectional asynchronous cell free network where at least two transceivers, TRs, exchange their information using a number of amplify and forward, AF, based access points, APs, the total transmit power subject to quality of service, QoS constraints on data-rates of the TRs, the transceiver device comprising processing circuitry and memory coupled with the processing circuitry, wherein the memory includes instructions that when executed by the processing circuitry causes the transceiver device to perform operations comprising:
  estimate channels between the at least two TRs and the AF-based APs;
  calculating a total power consumption for each channel tap;
  determine a single non-zero channel tap which results in a lowest total power consumption;
  based on the single non-zero channel tap determined:
    calculate beamforming matrices for the APs;
    calculate a total power transmission of each transceiver of the at least two transceivers;
    calculate precoding matrices at each transceiver of the at least two transceivers; and calculate post-channel equalizers at the at least two transceivers.

13. The transceiver device (202) of claim 12, wherein in calculating the total power consumption for each channel tap, the memory includes instructions that when executed by the processing circuitry causes the transceiver device to perform operations comprising:
  calculate the total power consumption in the network for the channel tap based on only those APs which contribute to the n-th tap of an end-to-end channel impulse response, CIR, are turned on while a remainder of the APs are turned off.

14. The transceiver device of claim 12,
  wherein in calculating precoding matrices at each transceiver of the at least two transceivers, the memory includes instructions that when executed by the processing circuitry causes the transceiver device to perform operations comprising select precoding matrices $E_1$, $E_2$ to be any two unitary matrices, wherein $E_1$ is a precoder matrix of TR1 and $E_2$ is a precoder matrix of TR2.

15. The transceiver device of claim 12, wherein in calculating post-channel equalizers at the at least two transceivers, the memory includes instructions that when executed by the processing circuitry causes the transceiver device to perform operations comprising select $$F_1 = E_1^H, F_2 = E_2^H,$$

wherein $F_1$ is a post-equalizer matrix of TR1 and $F_2$ is a post-equalizer matrix of transceiver 2.

16. The transceiver device (202) of claim 12, wherein in the total power consumption in the network for the channel tap, the memory includes instructions that when executed by the processing circuitry causes the transceiver device to perform operations comprising:
  initialize variables $$r_1', r_2', \text{ and } \mu$$

in accordance with $$r_1' = N_s(2^{r_1/N_s} - 1), r_2' = N_s(2^{r_2/N_s} - 1), \text{ and } \mu = (r_1' + r_2')/N_s,$$

where $r_1$ is a minimum required data rate at a first of the at least two TRs, TR1, 2 is a minimum required data rate at a second of the at least two TRs, TR2, and $N_s$ is a number of symbols per transmitted block;
  define set $\mathcal{N} = \{0 \leq n \leq L_c - 1 | \mathcal{C}_{n+1} \neq 0\}$, as the set of indices of those taps of the end-to-end CIR to which at least one AP contributes, wherein $\mathcal{C}_{n+1}$ is a set of those APs which contribute to the tap n of the end-to-end CIR and $L_c$, is a discrete-time end-to-end multi-tap channel length, $L_c$, as $$L_C = 1 + \left\lceil \frac{\tau_l}{T_s} \right\rceil,$$

wherein $\tau_l$ is an end-to-end propagation delay between TR1 and TR2 through $AP_l$ with $\tau_1 \leq \tau_2 \leq \tau_3 \leq \ldots \leq \tau_l$, and Ts is a symbol period
calculate $$l_n = |\hat{\mathcal{C}}_{n+1}|, \ i_n = \sum_{m=0}^{n-1} l_m, \text{ and } i'_n = L - i_n - l_n \text{ for } n \in \{0, 1, \ldots, L_c - 1\};$$

calculate $$\tilde{T}_n, \tilde{Q}_1^n, \tilde{Q}_2^n, \text{ and } \tilde{r}_{n+1}$$

in accordance with $$T = \begin{bmatrix} 1 & 0 & 0 \\ 0 & 1 & 0 \\ 0 & 1 & 0 \\ 0 & 0 & 1 \end{bmatrix}$$

$$\tilde{T}_n = I_{l_n} \otimes \text{diag}\{1, 2, 1\},$$

$$\tilde{Q}_1^n = blkdiag\{T^T((\hat{g}_{l1}\hat{g}_{l1}^H) \otimes I_2)T\}_{l=i_n+1}^{i_n+l_n},$$

$$\tilde{Q}_2^n = blkdaig\{T^T((\hat{g}_{l2}\hat{g}_{l2}^H) \otimes I_2)T\}_{l=i_n+1}^{i_n+l_n}$$

$$\tilde{r}_{n+1} = (I_{l_n} \otimes T^T)[\hat{g}_{(i_n+1)1}^T \otimes \hat{g}_{(i_n+1)2}^T \ \hat{g}_{(i_n+2)1}^T \otimes \hat{g}_{(i_n+2)2}^T \cdots \hat{g}_{(i_n+l_n)1}^T \otimes \\ \hat{g}_{(i_n+l_n)2}^T]^T$$

define $S_n(\lambda, z)$ and $\hbar_n(z)$ in accordance with $$S_n(\lambda, z) = \mu \tilde{Q}_2^n + \lambda(z \tilde{Q}_2^n + \tilde{T}_n) \text{ and}$$

$$h_n(z) = \frac{\frac{1}{z^2} - \lambda \tilde{r}_{n+1}^H S_n^{-1}(\lambda, z) \tilde{Q}_1^n S_n^{-1}(\lambda, z) \tilde{r}_{n+1}}{\lambda \tilde{r}_{n+1}^H S_n^{-1}(\lambda, z)(z \tilde{Q}_1^n + \tilde{T}_n) S_n^{-1}(\lambda, z) \tilde{r}_{n+1}} - \frac{1}{\mu}$$

set $z_l > 0$ small enough such that $\hbar_n(z_l) < 0$, and solving z $$z \tilde{r}_{n+1}^H S_n^{-1}(\lambda, z) \tilde{r}_{n+1} - 1 = 0$$

to find $\lambda$ associated to $z_l$, using a bisection method, as the unique positive solution to $$z \tilde{r}_{n+1}^H S_n^{-1}(\lambda, z) \tilde{r}_{n+1} - 1 = 0;$$

set $z_u > 0$ large enough such that $\hbar_n(z_l) > 0$, and solving $$z \tilde{r}_{n+1}^H S_n^{-1}(\lambda, z) \tilde{r}_{n+1} - 1 = 0$$

to find $\lambda$ associated to $z_u$, using the bisection method, as the unique positive solution to $$z \tilde{r}_{n+1}^H S_n^{-1}(\lambda, z) \tilde{r}_{n+1} - 1 = 0;$$

responsive to $\hbar_n(z) < \epsilon$, setting $$z = \frac{z_l + z_u}{2}$$

and solving $$z \tilde{r}_{n+1}^H S_n^{-1}(\lambda, z) \tilde{r}_{n+1} - 1 = 0$$

to find $\lambda$ associated to z, and setting $z_n = z$ and set $\lambda_n = \lambda$, wherein $\epsilon$ determines a precision of the bisection method; and
calculate the total power consumption in the network for the channel tap in accordance with $$K_n = z_n + \frac{\mu}{\lambda_n}$$

wherein $K_n$ is the total power consumption for the channel tap$_n$.

17. The transceiver device of claim 16, wherein the memory includes instructions that when executed by the processing circuitry causes the transceiver device to perform operations comprising:
responsive to $\hbar_n(z) < 0$:
set $z_l = z$
solve $$z \tilde{r}_{n+1}^H S_n^{-1}(\lambda, z) \tilde{r}_{n+1} - 1 = 0$$

to find $\lambda$ associated to $z_u$
set $$z = \frac{z_l + z_u}{2},$$

and solving $$z \tilde{r}_{n+1}^H S_n^{-1}(\lambda, z) \tilde{r}_{n+1} - 1 = 0$$

to find $\lambda$ associated to z.

18. The transceiver device of claim 16, wherein the memory includes instructions that when executed by the processing circuitry causes the transceiver device to perform operations comprising:
responsive to $\hbar_n(z) > 0$:
set $z_u = z$
solve $$z \tilde{r}_{n+1}^H S_n^{-1}(\lambda, z) \tilde{r}_{n+1} - 1 = 0$$

to find $\lambda$ associated to $z_l$ setting $$Z = \frac{z_l + z_u}{2},$$

and solving $$z\hat{r}_{n+1}^H S_n^{-1}(\lambda, z)\hat{r}_{n+1} - 1 = 0$$

to find $\lambda$ associated to z.

19. The transceiver device of claim 12, wherein in determining the single non-zero channel tap which results in a lowest total power consumption the memory includes instructions that when executed by the processing circuitry causes the transceiver device perform operations comprising determine the single non-zero channel tap in accordance with $$n^\circ = \arg\min_{n\in N} K_n$$

wherein $K_n$ is the total power consumption for channel tap$_n$.

20. The transceiver device of claim 12, wherein in the beamforming matrices for the APs, the memory includes instructions that when executed by the processing circuitry causes the transceiver device to perform operations comprising:
calculate $$a^\circ = \beta\left[0^T_{M^2 i_{n^\circ}\times 1} \quad k^T \quad 0^T_{M^2 i'_{n^\circ}\times 1}\right]^T$$

where $$k = blkdiag\{U_l^* \otimes U_l^*\}_{l=i_{n^\circ}+1}^{i_{n^\circ}+l_{n^\circ}}(I_{l_{n^\circ}} \otimes T)S_{n^\circ}^{-1}(\lambda_{n^\circ}(z_{n^\circ}), z_{n^\circ})\hat{r}_{n^\circ+1}$$

$$\beta = \sqrt{\frac{\mu}{\lambda_{n^\circ}(Z_{n^\circ})\hat{r}_{n^\circ+1}^H\left(\mu\tilde{Q}_2^{n^\circ}\left(z_{n^\circ}\tilde{Q}_1^{n^\circ} + \tilde{T}_{n^\circ}\right)^{-\frac{1}{2}} + \lambda_{n^\circ}(z_{n^\circ})\left(z_{n^\circ}\tilde{Q}_1^{n^\circ} + \tilde{T}_{n^\circ}\right)^{+\frac{1}{2}}\right)^{-2}\hat{r}_{n^\circ} + 1}}$$

and
reshape a° to obtain the optimal value of the BF matrices of $A_1, A_2, \ldots, A_L$ from $$a^\circ = \left[vec^T(A_1) \quad vec^T(A_2) \quad \ldots \quad vec^T(A_L)\right]^T$$

wherein $U_l$ is an M×2 matrix with orthogonal columns which spans the subspace spanned by $g_{l,1}, g_{l,2}$ wherein the at least two TRs comprise two TRs, $g_{l,1}$ is a channel vector between TR1 and the l-th AP, and $g_{l,2}$ is a channel vector between transceiver 2 and the l-th AP.

* * * * *